US011617088B2

(12) United States Patent
Clark et al.

(10) Patent No.: US 11,617,088 B2
(45) Date of Patent: Mar. 28, 2023

(54) REAL-TIME RF SPECTRUM ALLOCATION AND OPTIMIZATION IN MULTI-FUNCTION, CO-LOCATED, INTERACTING HETEROGENEOUS NETWORKS

(71) Applicant: General Dynamics Mission Systems, Inc., Fairfax, VA (US)

(72) Inventors: William Clark, Fairfax, VA (US); Peter Oppong Okrah, Fairfax, VA (US)

(73) Assignee: General Dynamics Mission Systems, Inc.

( * ) Notice: Subject to any disclaimer, the term of this patent is extended or adjusted under 35 U.S.C. 154(b) by 420 days.

(21) Appl. No.: 16/848,609

(22) Filed: Apr. 14, 2020

(65) Prior Publication Data

US 2020/0396618 A1    Dec. 17, 2020

Related U.S. Application Data

(63) Continuation-in-part of application No. 16/443,232, filed on Jun. 17, 2019, now Pat. No. 10,911,957.

(51) Int. Cl.
*H04W 16/14*      (2009.01)
*H04W 24/02*      (2009.01)
*H04W 16/04*      (2009.01)

(52) U.S. Cl.
CPC ........... *H04W 16/14* (2013.01); *H04W 16/04* (2013.01); *H04W 24/02* (2013.01)

(58) Field of Classification Search
CPC ...... H04W 16/14; H04W 24/02; H04W 16/04
See application file for complete search history.

(56) References Cited

U.S. PATENT DOCUMENTS

| | | | |
|---|---|---|---|
| 6,327,300 B1 | 12/2001 | Souissi et al. | |
| 7,596,323 B1 * | 9/2009 | Price | ................... H04L 27/2096 |
| 2006/0172705 A1 | 8/2006 | Mathur | |
| 2015/0078346 A1 | 3/2015 | Farhadi | |
| 2015/0341930 A1 * | 11/2015 | Fitch | ................... H04W 64/006 |
| 2016/0033807 A1 | 2/2016 | Junge et al. | |
| 2018/0270669 A1 | 9/2018 | Fortman et al. | |
| 2018/0376342 A1 | 12/2018 | Macmullan et al. | |

* cited by examiner

*Primary Examiner* — Ronald B Abelson
(74) *Attorney, Agent, or Firm* — LKGlobal | Lorenz & Kopf, LLP

(57) ABSTRACT

A real-time spectrum optimization and allocation is provided within multifunction, co-located, interacting heterogeneous networks. Quantum statistical allocation techniques may be adapted to networks with nodes that behave indistinguishably and distinguishably, within a common geographic locational area. If the network nodes are indistinguishable, their statistical behavior may be Fermionic or Bosonic. Fermionic nodes occupy a single or the same state with some form of degeneracy. Bosonic nodes may occupy a single or the same state, with or without degeneracy. If the nodes are distinguishable, then their statistical behavior is Boltzmann-like, and they may occupy the same state provided there is degeneracy to the overall bandwidth allowing information to be transferred.

20 Claims, 24 Drawing Sheets

Quantum States & Statistics

States of Matter

Described by Quantum Statistical Mechanics.

Radio States & Statistics

States of Radio Networks

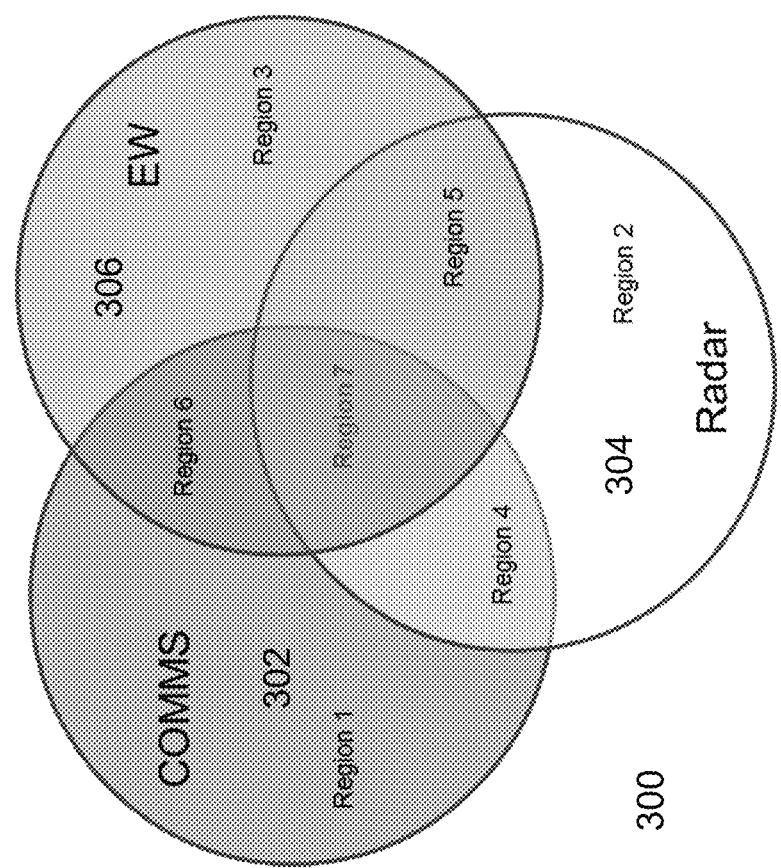

| CMD | Communications | | | | Radar | | | | EW | | | |
| --- | --- | --- | --- | --- | --- | --- | --- | --- | --- | --- | --- | --- |
| Intent | Subnet | Stats | Alloc | Util | Subnet | Stats | Alloc | Util | Subnet | Stats | Alloc | Util |
| $I_1$ | C1 | Bose | High | High | R2 | Fermi | Med | Med | EW4 | Bose | High | High |
| $I_2$ | C1 | Bose | High | Med | R1 | Fermi | High | Low | EW2 | Bose | High | Med |
|  | C2 | Bose | High | Low | R2 | Fermi | High | Low | EW3 | Fermi | Med | Med |
|  | C3 | Bose | High | Low | R3 | Fermi | High | Low |  |  |  |  |
|  | C4 | Bose | High | Low |  |  |  |  |  |  |  |  |
| $I_3$ | C3 | Fermi | Med | Med | R1 | Fermi | High | High | EW3 | Fermi | Med | Med |
|  |  |  |  |  | R2 | Fermi | High | High | EW4 | Fermi | Med | Med |
|  |  |  |  |  |  |  |  |  | EW5 | Bose | Low | Low |

FIG.15

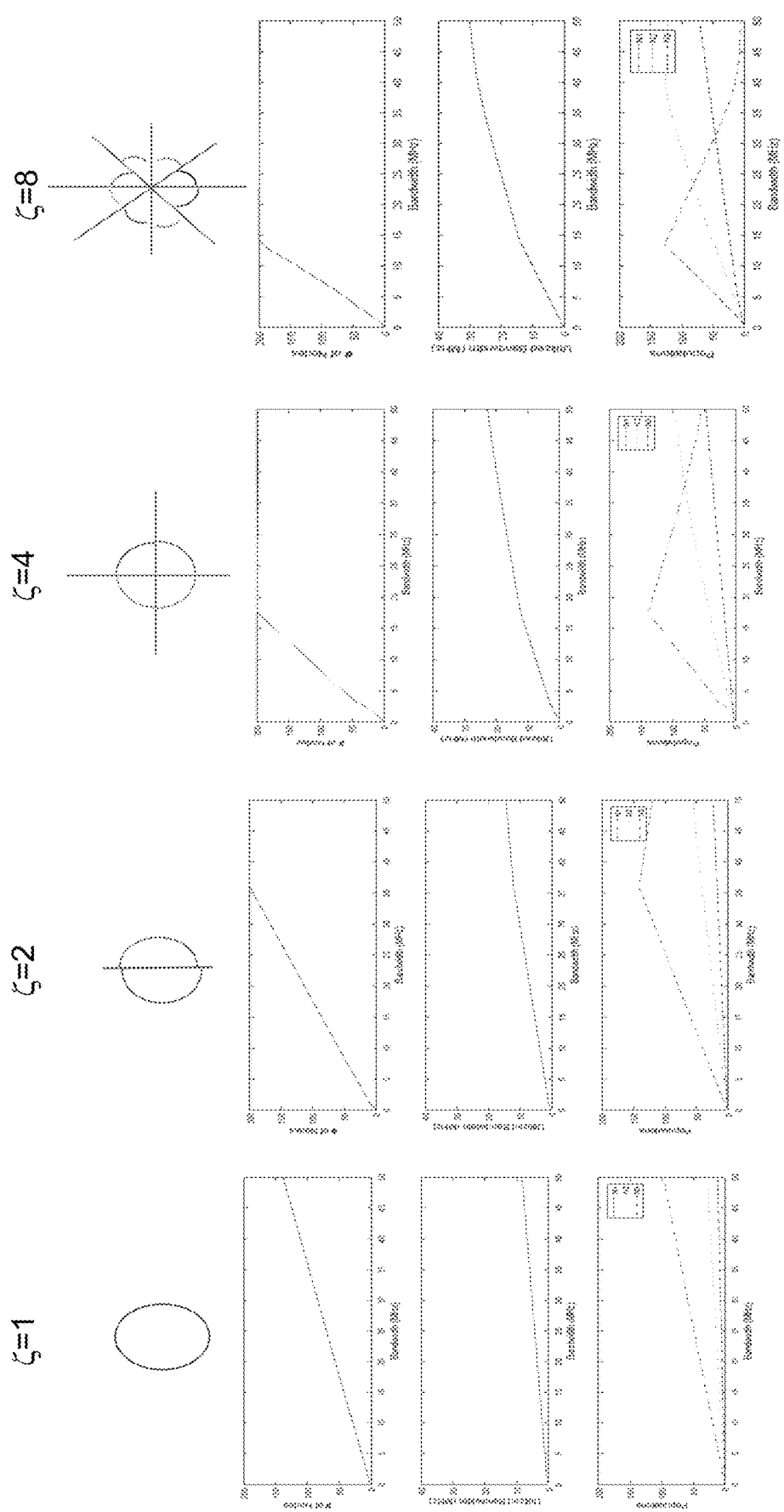
FIG. 16A: Modeling Directionality

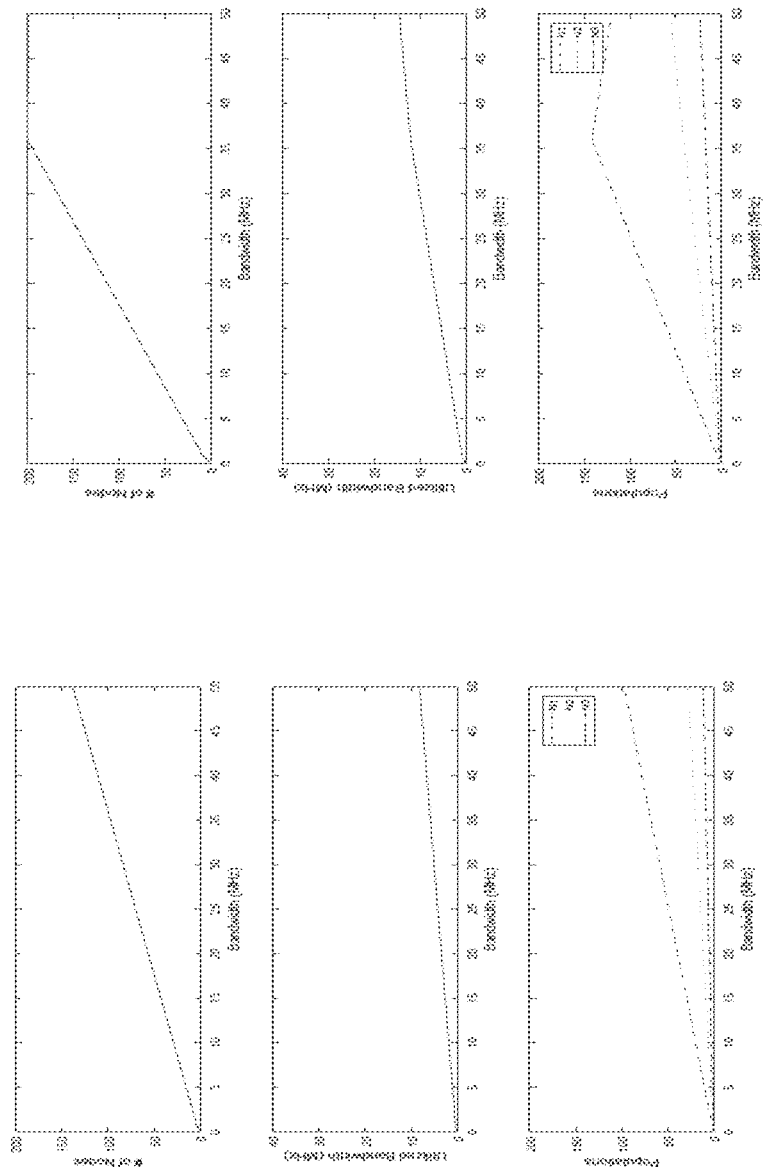
FIG. 16B: Modeling Polarization

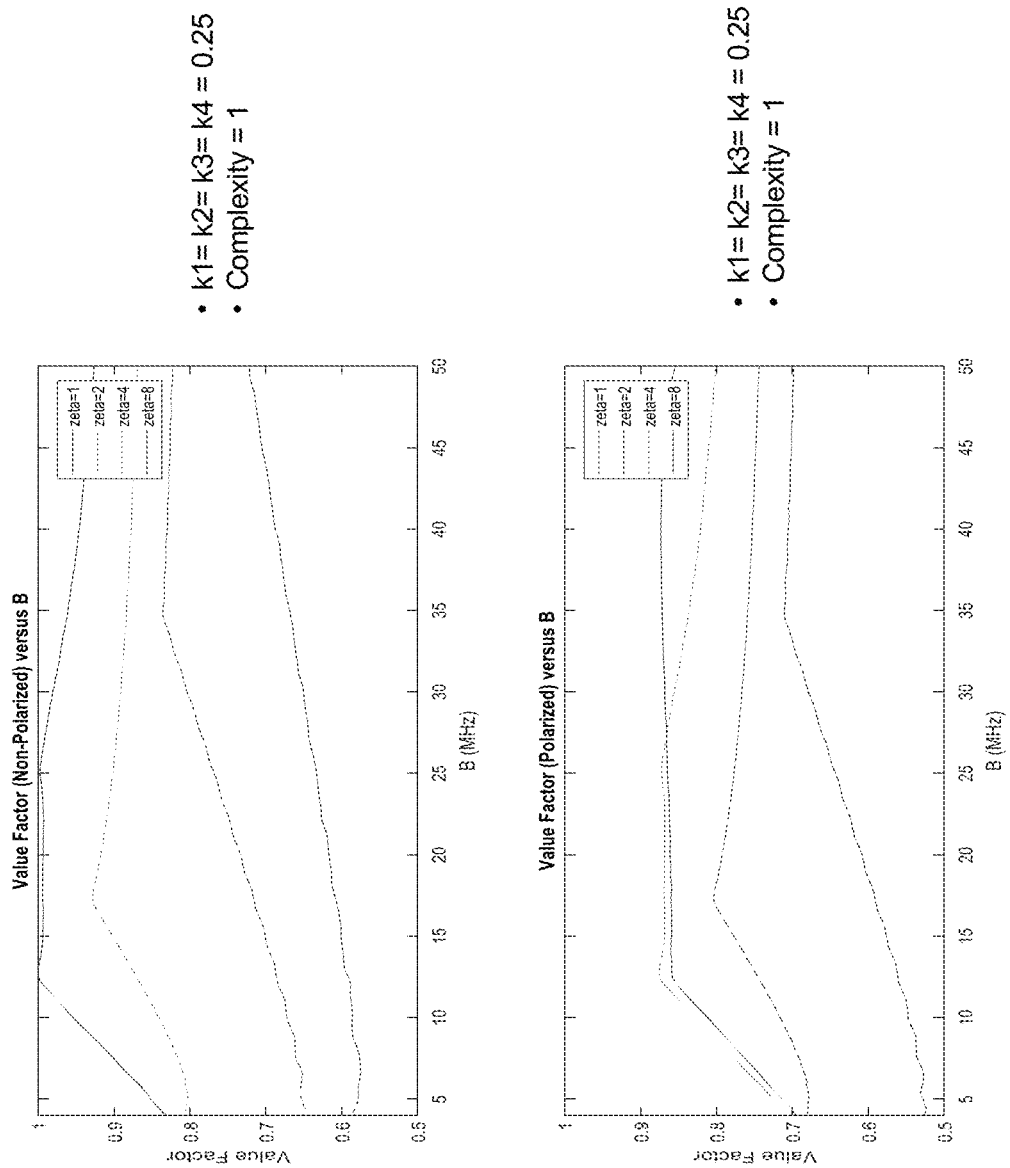
FIG. 17: Cost/Time Evaluation

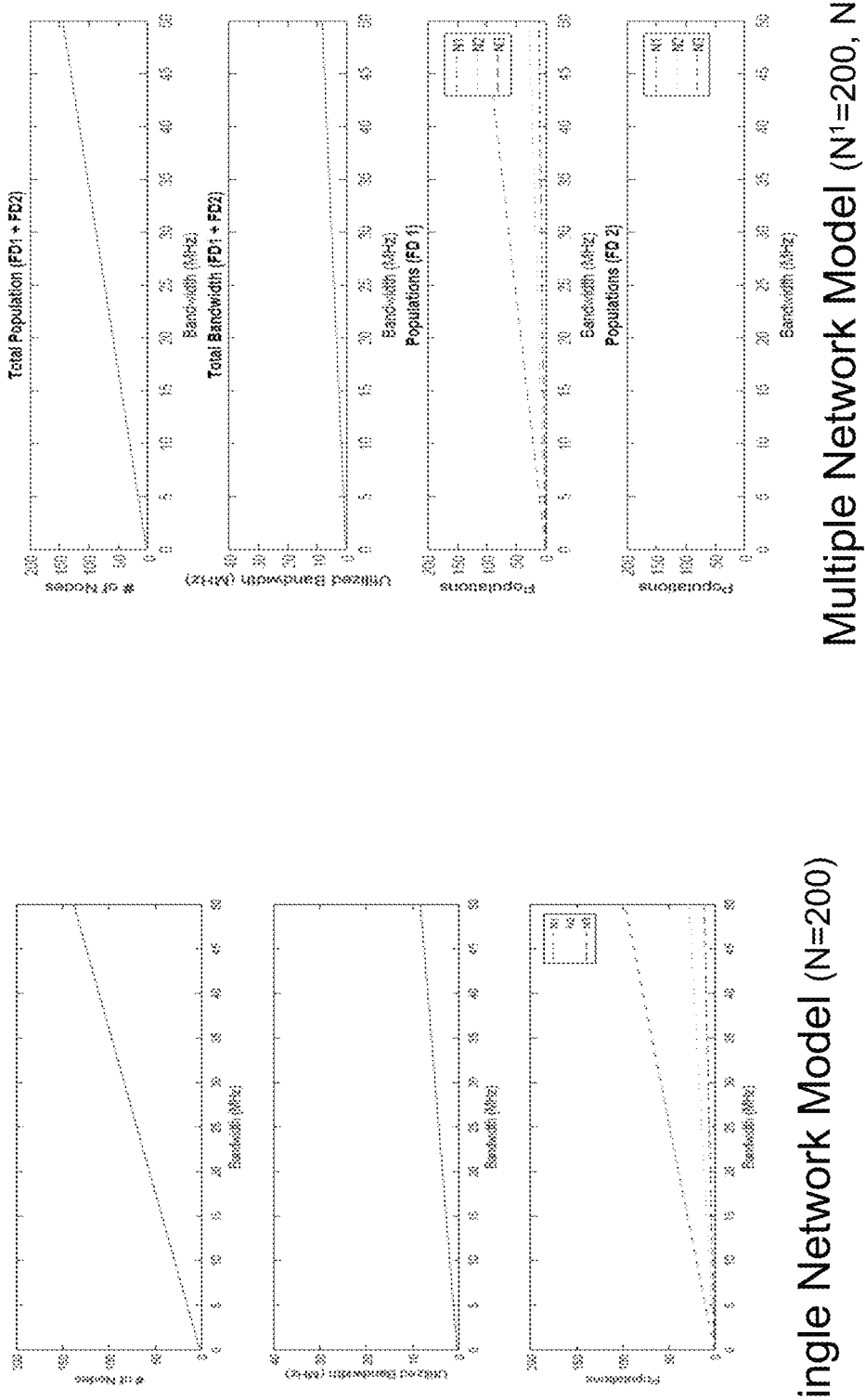
FIG. 18A: Model Comparison

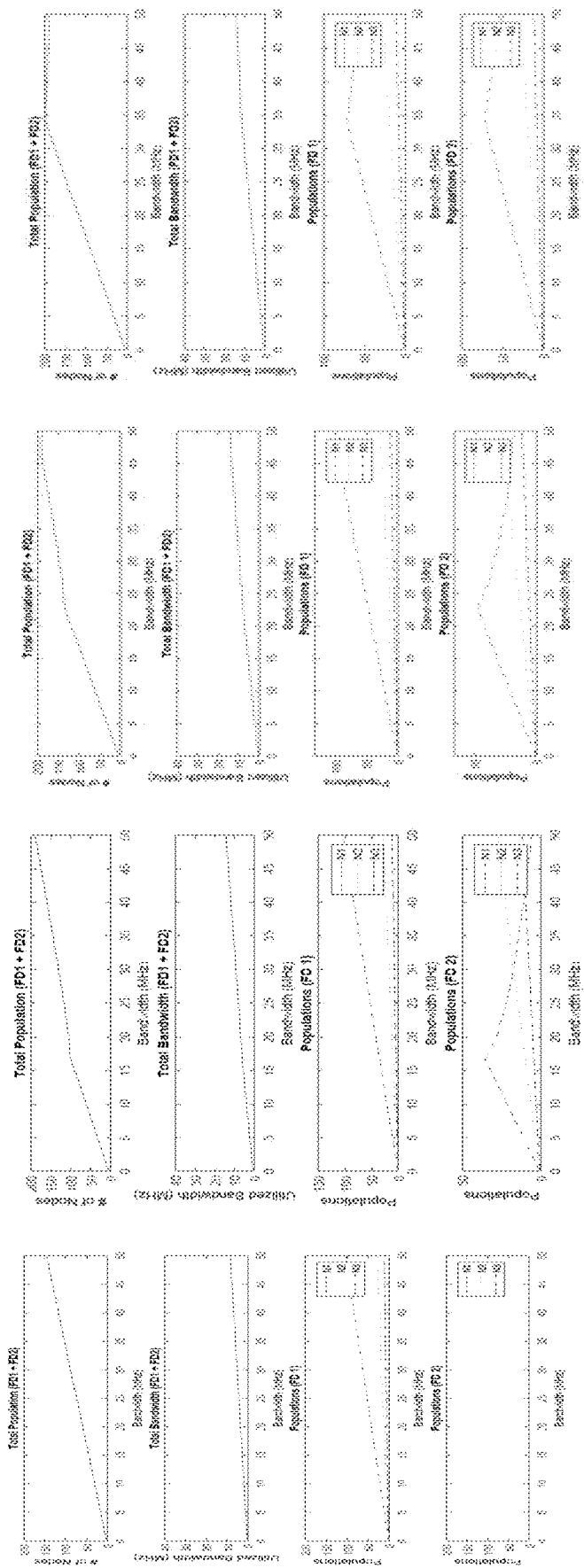
FIG. 18B: Multiple Network Population Distributions

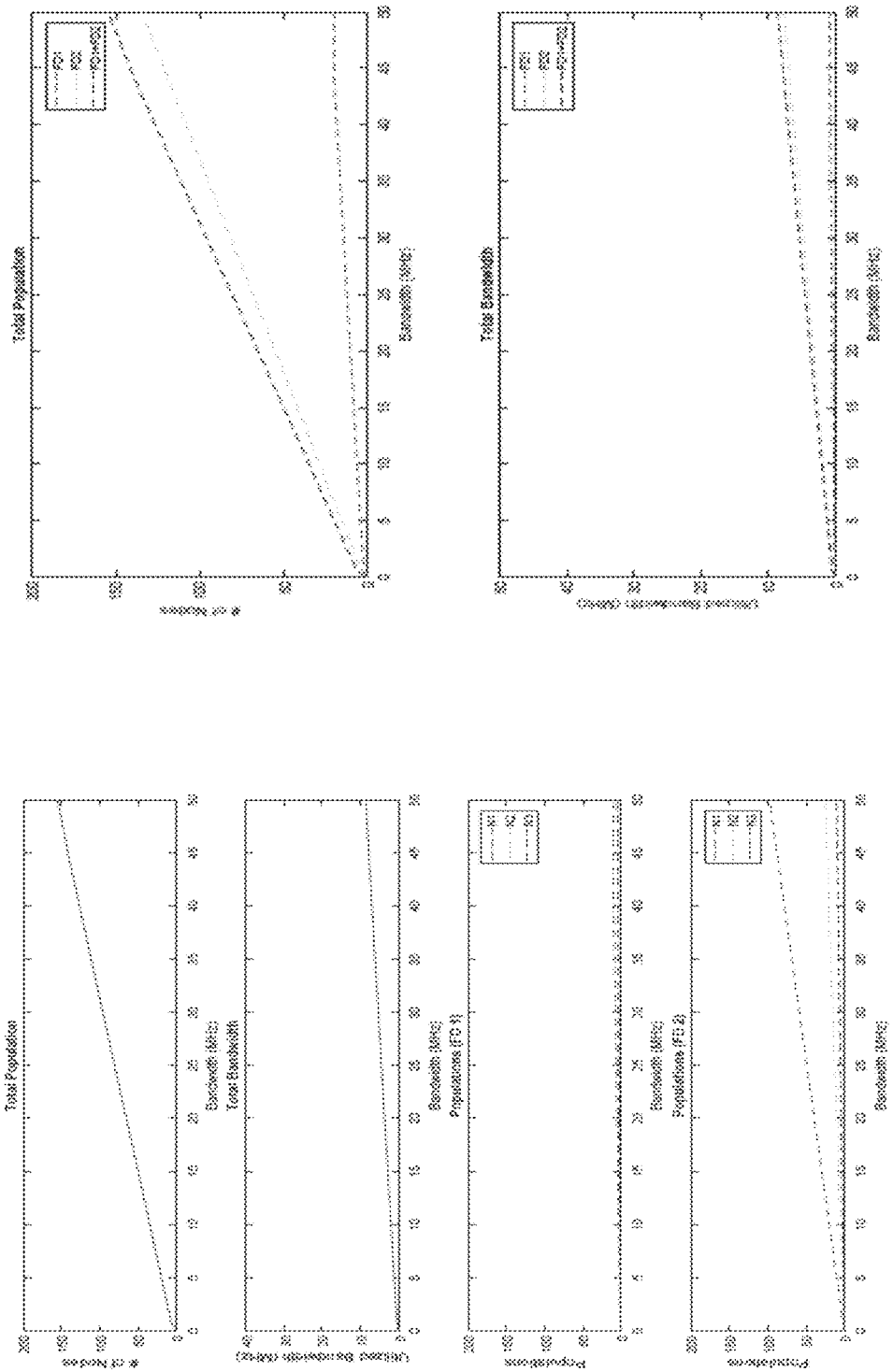
FIG. 19A: Mixed Model

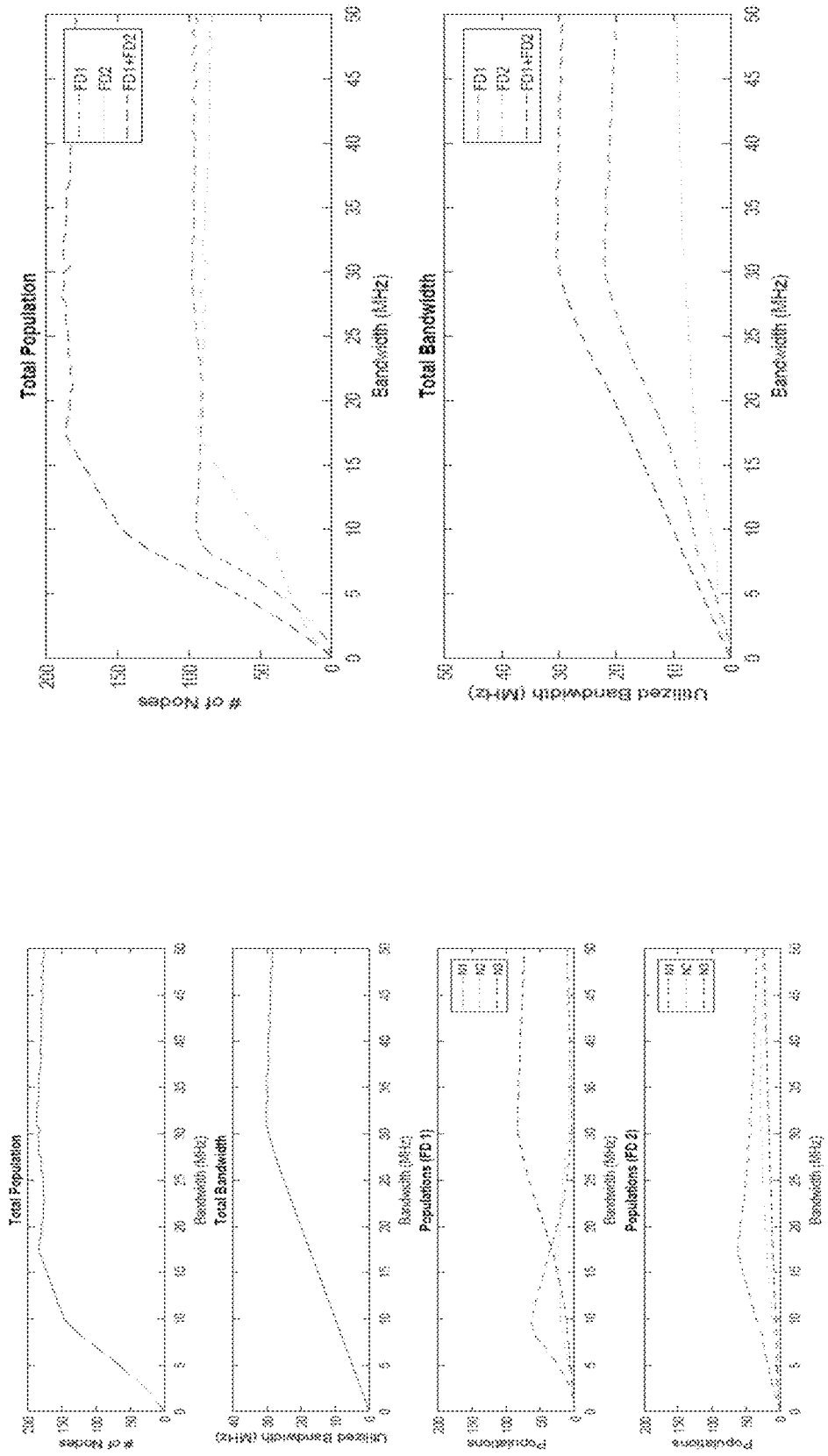
FIG. 19B: Mixed Model

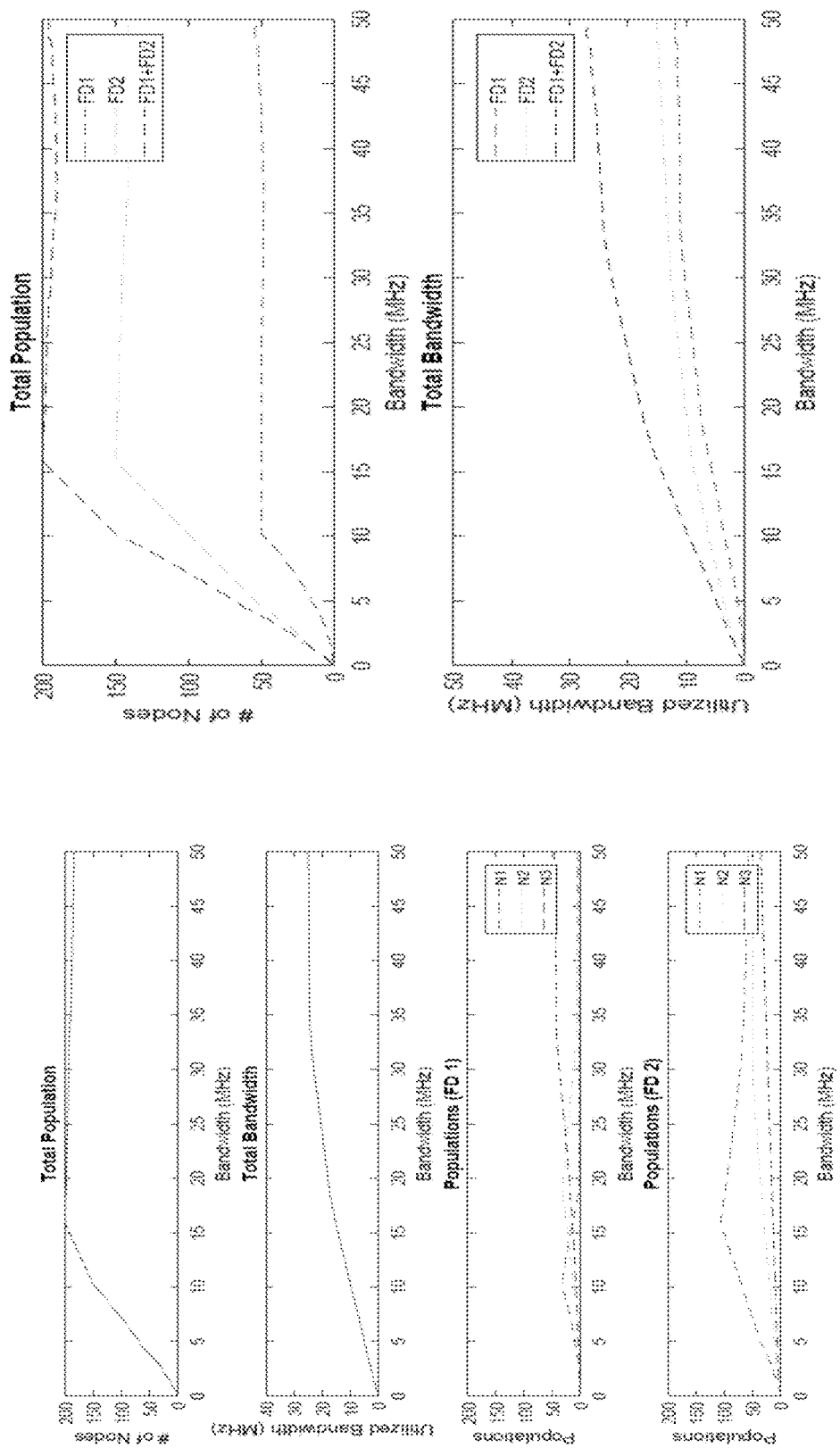
FIG. 19C: Mixed Model

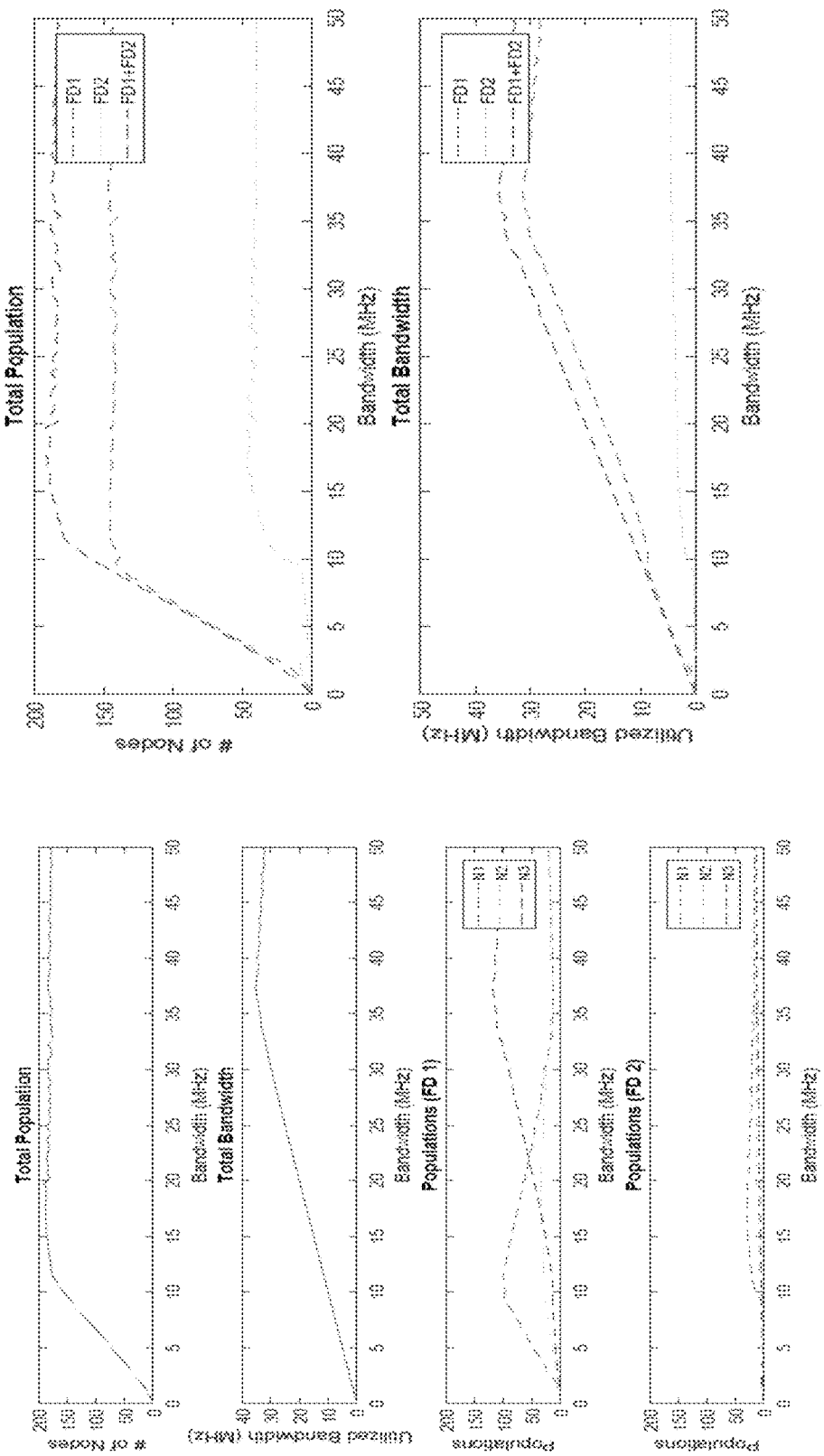
FIG. 19D: Mixed Model

REAL-TIME RF SPECTRUM ALLOCATION AND OPTIMIZATION IN MULTI-FUNCTION, CO-LOCATED, INTERACTING HETEROGENEOUS NETWORKS

CROSS-REFERENCE TO RELATED APPLICATION

This application is a continuation-in-part of U.S. patent application Ser. No. 16/443,232 filed Jun. 17, 2020 and incorporates its contents in their entirety.

TECHNICAL FIELD

The present disclosure relates generally to communication networks, and more particularly to a method and apparatus for allocating and optimizing radio frequency (RF) spectrum in multi-function, co-located, interacting heterogeneous networks (COMMS, Radar, EW) in real time.

BACKGROUND

A user's ability to access services via an RF connected device is dependent on the availability of capacity on various network elements, e.g., radio access networks, node site equipment, and so on. Radio operations in theaters of operation often have tessellated/cellular structure which consist of nodes and clusters of RF communications assets. These different nodes or clusters can lie within different regional jurisdictions which, through national regulation, assign different bands of frequencies for different uses. Because of this, the spectrum use of the RF assets must be carefully assigned. Often, interference is higher within individual nodes or tessellation. Structurally, this interference causes the need for the reduction of the number of users and less re-use of frequencies within nodes, and more re-use of frequencies between nodes and clusters, thus reducing system efficiency.

To accommodate for these situations, traditionally, RF spectrum use is planned, typically at least days in advance. The allocation of RF spectrum however is not optimized across multiple heterogeneous RF functional networks (COMMS, Radar, EW). Changes in electromagnetic conditions, including an increased number of users, conflicts, or interference, often lead to further spectrum conflicts that reduce the amount of information which can be reliably exchanged in a timely manner. To resolve these conflicts, RF spectrum adaptation is often needed to increase amount of information that can be reliably exchanged at an acceptable level. Present systems which effect this spectrum adaption, are uncoordinated between nodes and cannot function in adequate time periods (real-time or near real-time). According there is a need to provide a method and a system implemented within a circuit or computer, which manages the distribution of bandwidth and spectrum for a multi-function RF network (COMMS, Radar, EW).

SUMMARY

In accordance with the present disclosure, a communication management system, is provided which uses informational quantum statistical paradigms to assign frequencies and bandwidth for multi-functional RF spectrum use. The communication management system may allocate bandwidth & frequencies in a restricted state space. The communication management system may also use computational and perturbative techniques to extend the analysis in additional dimensions, or degrees of freedom, for higher fidelity allocations of spectrum in the future.

In one embodiment, the present disclosure provides a method for allocating and optimizing radio frequency spectrum for a fixed wireless network. The method of the present disclosure is based on bandwidth needs and frequency spectrum constraints for each node in the network.

In one embodiment, the present disclosure teaches a method and apparatus for selecting a bandwidth option for a node in a communication in a network. The method obtains and evaluates, for the node, network traffic data for a geographical area for mobile and fixed location RF information traffic.

In accordance with the present disclosure, a method is provided for selecting a bandwidth option for a node in a network. Spectrum availability data associated with mobility traffic and fixed wireless traffic for a geographical area is obtained. Multi-function missions, statistics, frequency/bandwidth allocation and utilization data is processed to determine a bosonic condition. For a first bosonic condition spectrum is allocated where all nodes should be allocated equal bandwidth. Network nodes transition to higher bandwidth states when bandwidth increases. For a second bosonic condition, to maximize bandwidth, a soft population constraint is utilized where some nodes may not be allocated any bandwidth and where nodes transition to higher bandwidth states as available bandwidth increases. For a third Fermionic condition, frequency and bandwidth of network nodes are maximized by the allocation of spectrum, where all nodes should be allocated bandwidth. One of the bandwidth assignment configuration conditions described above and selected is outputted to a controller that configures transmission and receiver properties of the node range based on the type of connectivity at each node location.

In one embodiment, a maximum bandwidth option may be selected from the plurality of bandwidth options.

In one embodiment a surplus spectral capacity is assessed and the bandwidth of a node is increased when there is surplus capacity.

As described above, a spectral optimization approach is provided based on the mapping of network nodes to quantum analogs with associated discrete states and statistical behavior. In particular, the spectral control system is provided which may use bandwidth to represent discrete system node discrete states, and/or node state degeneracy (if it corresponds to two or more different measurable states) to account for degrees of freedom to support spectrum reuse. The spectral control system may use a micro canonical quantum statistical formulation to determine optimum spectrum bandwidth allocation among interacting, similar and dissimilar multifunctioning networks all sharing a fixed amount of available spectrum.

In one embodiment, the spectral control system may include a computer that can be implemented in a distributed fashion throughout a network to realize efficient adaptation to spectrum usage.

Consistent with the teachings herein, a real-time spectrum optimization and allocation is provided within multifunction, co-located, interacting heterogeneous networks. Quantum statistical allocation techniques may be adapted to networks with nodes that behave indistinguishably and distinguishably, within a common geographic locational area. If the network nodes are indistinguishable, their statistical behavior may be Fermionic or Bosonic. Fermionic nodes occupy a single or the same state with some form of degeneracy. Bosonic nodes may occupy a single or the same state, with or without degeneracy. If the nodes are distinguishable, then their statistical behavior can be determined using a Boltzmann equation or transfer function, and they may occupy the same state provided there is degeneracy to the overall bandwidth allowing information to be transferred.

BRIEF DESCRIPTION OF THE DRAWINGS

The teaching of the present disclosure can be readily understood by considering the following detailed description in conjunction with the accompanying drawings, in which:

FIG. 14 represents differentiating heterogeneous networks;

FIG. 15 represents interpreting commander's intent and allocating frequency and bandwidth based on this intent;

FIGS. 16A and 16B represent modeling directionality & polarization;

FIG. 17 represents establishing & evaluating cost/value for allocating frequency and bandwidth;

FIGS. 18A and 18B represent the Modeling Multiple Networks for allocating frequency and bandwidth; and FIGS. 19A-19D represent the results of the allocation frequency and bandwidth for the mixed model shown in FIGS. 18A and 18B.

To facilitate understanding, identical reference numerals have been used, where possible, to designate identical elements that are common to the figures.

DETAILED DESCRIPTION

The present disclosure broadly as shown in FIGS. 1-19D teaches a method and apparatus for allocating and optimizing radio frequency spectrum in a planned radio frequency spectrum functional network (COMMS, Radar, EW). The system 100 provides spectrum and bandwidth optimization and allocation in multifunction, co-located, interacting heterogeneous networks. Such heterogeneous networks are formed of connected computers and other devices where the operating protocols of each element in the network are significantly different. The systems and methods described below are applied to networks with nodes that behave indistinguishably and distinguishably, within a common geographic area.

As described below, if the network nodes are indistinguishable, communication bandwidth and frequencies are assigned such that a network node's statistical behavior, and associated control configuration, may be Fermionic or Bosonic. When the system assigns a Fermionic configuration to nodes, the nodes occupy the same state, with some form of degeneracy. When the system assigns a Bosonic configuration to node, the nodes occupy the same state with or without degeneracy. In the nodes that are distinguishable, communication bandwidth and frequencies are assigned such that a network node's statistical behavior, and associated control configuration uses a Boltzmann equation or transfer function, and they may occupy the same, or configuration, state provided there is degeneracy, meaning if it corresponds to two or more different measurable states of a quantum defined communications system. Although the teachings of the present disclosure are discussed below in the context of multiple RF functional (Heterogeneous) networks, the teaching is not so limited. Namely, the teachings of the present disclosure can be applied for other types of wireless networks or cellular networks (e.g., 4G network, 5G network and the like), wherein allocating and optimizing a radio frequency spectrum is beneficial.

Figure 1:
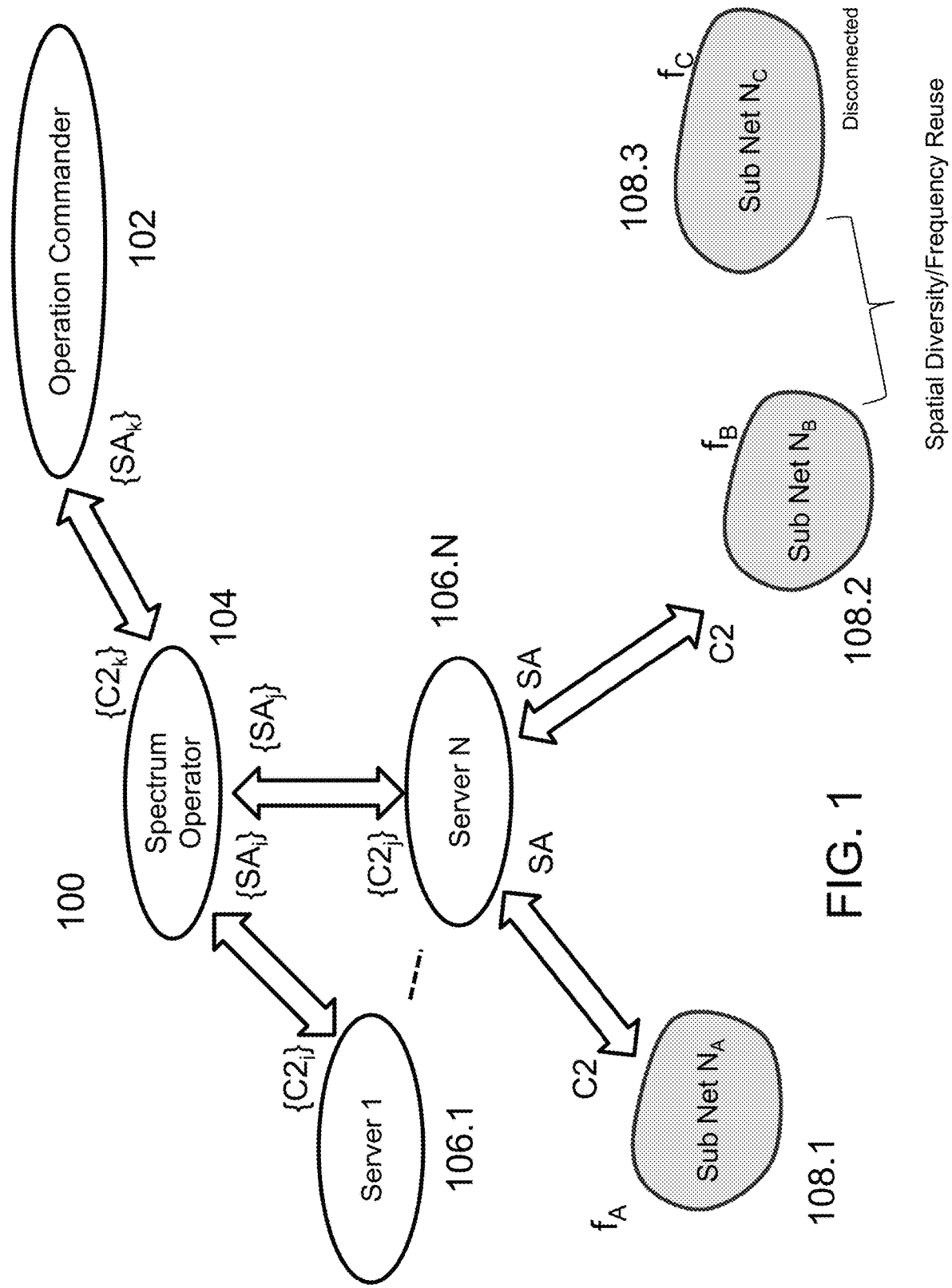
FIG. 1 represents a systematic view of a Command and Mission Driven and gap analysis.

FIG. 1 represents a systematic view of the communication system network 100 or simply network 100 using spectrum gap analysis and informational quantum statistical paradigms to assign frequencies and bandwidth to Nodes (102-108C) for multi-functional RF spectrum use. The network 100 may include Internet Protocol (IP) networks, ethernet networks, wireless networks, cellular networks, satellite-based networks, and the like. The network 100 may include a circuit or computer which has functional components that operate as an operations commander node 102, a spectrum operator node 104, a plurality of servers 106.1-106.N (also called nodes and collectively referred by 106) and one or more subnetwork servers 108.1-108.3 (also called nodes and collectively referred by 108) such as S2 (legacy allowing audio and visual transmission) and combination of legacy S2 and other architectures such as Next Generation or Future via an access network. While three subnetwork servers are illustrated in FIG. 1, one skilled in the art will recognize that more or less subnetwork servers may be present.

The spectrum operator node 104 is configured to be systematically aware of the spectrum use and spectrum bandwidth. Specifically, the spectrum operator node 104 includes processors and sensors to monitor and evaluate the use of the spectrum and the overall electromagnetic spectrum based on expected needs within a prescribed geographical area. In this regard, the spectrum operator node 104 can conduct global RF situational awareness. In the context of the present disclosure, global indicates within the prescribed geographical area. Upon evaluating the global RF situational awareness, the spectrum operator node 104 conducts global optimal estimation and learning and can make global decisions. The spectrum operator node 104 evaluates and has access to large data sets which allows it to conduct large-scale real-time optimization of spectral and bandwidth use as well as Command and Control (C2) of the network through spectrum and band width allocation.

The servers 106 are also mission aware, meaning they can monitor and evaluate the use of the spectrum in their domains and adapt using forecasting the expected future spectral needs. In this regard, the servers 106 have regional RF Situational awareness and are capable of regional optimal estimation and learning. The servers 106 can make regional operator and autonomous decisions, such as the allocation of spectral bandwidth within a geographic region. The servers 106 further can handle the transfer and management of medium sized data sets and can do medium-scale real-time optimization and Command and Control. This information can optionally be fed to other subnetwork servers 108 as well as the spectrum operator node 104.

The subnetworks servers 108 have local collaborative RF Situational Awareness, such as Electronic Warfare and bandwidth needs. These subnetworks servers 108 allow for local spectral optimal estimation using the Quantum allocation techniques described below. Further these subnetwork servers 108 allow for local operator and autonomous decisions related to local allocation and Command and Control in emergency situations. The subnetwork servers 108 have limited need for data exchange and are able to transmit and manage small data sets. Additionally, the subnetwork servers 108 can be configured to allow for local, fast real-time optimization and learning.

Users accessing the network 100 understand that system access may not be available everywhere. In addition, the users also expect the throughput level and quality of access may vary. For example, the bandwidth need of the particular node may be based on forecast data, a traffic mix of the mobility traffic and the RF traffic, a consideration of change in traffic pattern when new applications emerge.

The communication system network 100 may be expanded by including additional endpoint devices, access networks, network elements, and/or application servers, without altering the teachings of the present disclosure. The above network 100 is described to provide an illustrative environment in which data for various services, e.g., voice, data, and/or multimedia services, are transmitted on the network 100 where system loading can be modified by increasing the number of nodes intermittently (e.g., near a scheduled sporting event) or by adapting the types and bandwidth a particular user can utilize at a particular time. This can be, by way of non-limiting example, reducing the amount of bandwidth available for the streaming of video content near a sporting event.

In order to ensure capacity is available to system users, each of the levels 102-108 may forecast the demand for the nodes and/or radio access networks within a region of the prescribed geographic area. Equipment such as antennas, base stations, backhaul equipment, and the like may then be allocated based on the forecasted demand. However, keeping up with the demand by adding more and more network resources requires foresight. Thus, the system administrator may wish to improve the utilization within a region the use of virtual network resources such as those used in a Communication Platforms as a Service (CPASS) systems.

Figure 2:
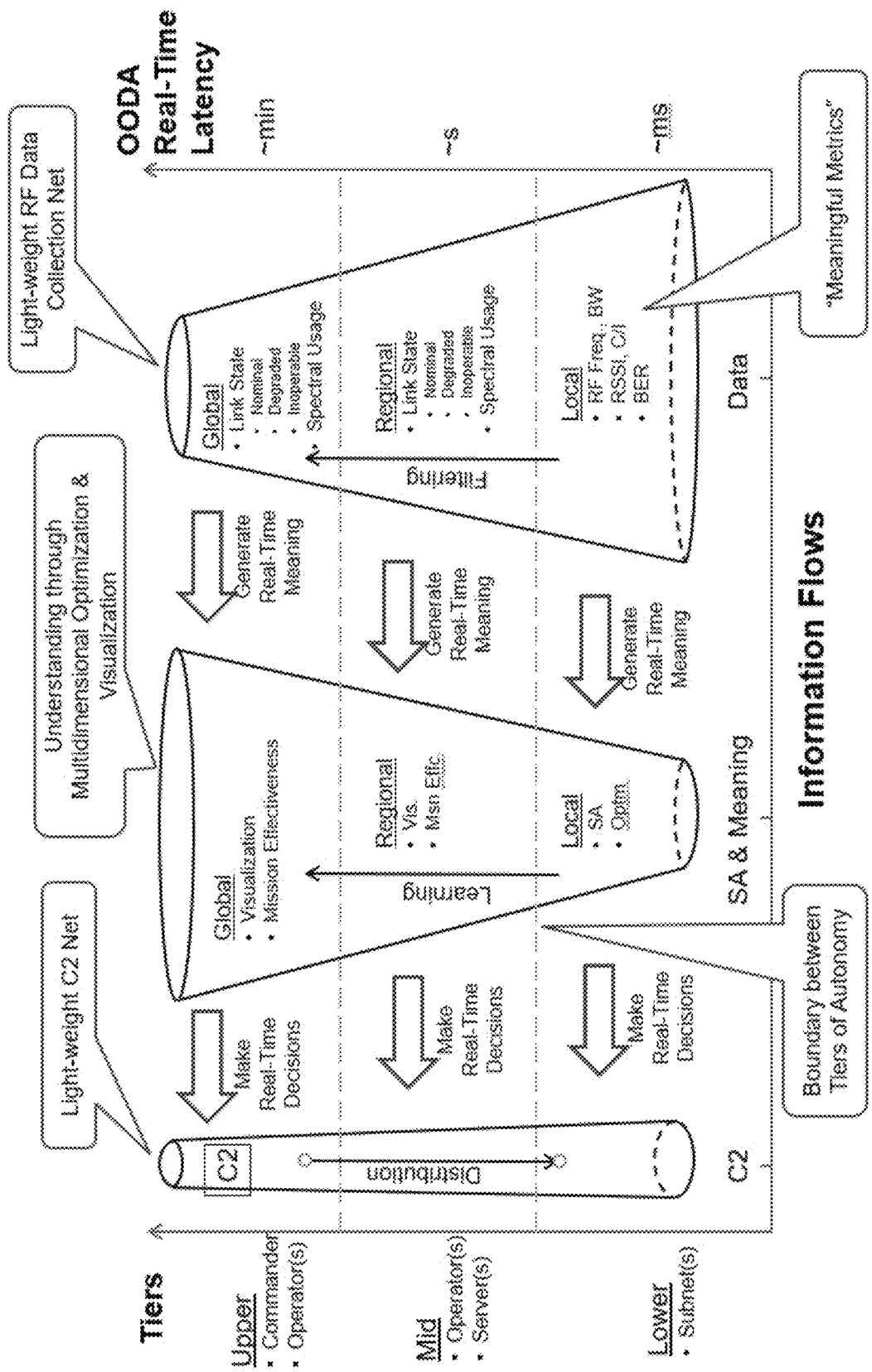
FIG. 2 represents information flow for command and control (C2), situational awareness (SA), and data on a network according to the present teachings.

FIG. 2 represents information flow for command and control (C2), situational awareness, and data, that is subjected to spectrum allocation, using a framework of quantum statistical mechanics. (See also FIGS. 3A and 3B). The spectrum requirements and availability may be assigned based on several factors. For example, the factors that affect the spectrum requirements for each node 102, 104, 106, 108 may include one or more of: forecasted node traffic for mobility traffic, forecasted node traffic for fixed RF traffic, target spectrum utilization limits for both mobility and fixed RF traffic, availability of multiple carrier frequencies, terrain type, power limits on user endpoint devices, types of user endpoint devices, power limits on base stations, antenna tilts, etc.

Shown is the modification of throughput for various signals such as light-weight Command and Control Network traffic by evaluating multidimensional optimization and visualization, and situational acquired data for light-weight RF data collection network. For each of these various signals, depicted are upper, middle, and lower tiers representing global, regional, and local geographic regions. Each of these tiers represent data latency of min, sec, and microseconds for observing, orienting, deciding, and enabling (OODA Loop) to control and optimize the spectrum associated with the nodes 102, 104, 106, 108 in network 100. To improve the responsiveness of the spectrum allocation, the aforementioned systems utilize allocation described below.

Approaches to assigning channels (frequencies) to the nodes, use theoretic information flow to model the system requirements. The Mid-Tier and Upper Tier (Level 2: Operator/Server and Level 3: Commander) communicate with Lower Tier (Level 1: Subnets) to set the total bandwidth, priority nodes, and occupied bands. Using a first allocation schema, the available bandwidth is divided into a number of equal small bands. A number of small bands may be aggregated to get a wide band. The Lower Tier (Level 1: Subnets) assign bandwidths to nodes of high priority, if any. Randomly allocate bands are assigned to remaining nodes based on a selection algorithm. In the case of conflict, bands are reselected and re-allocated. The bands are filled until the predicted number/type of nodes is achieved.

Figure 3A:
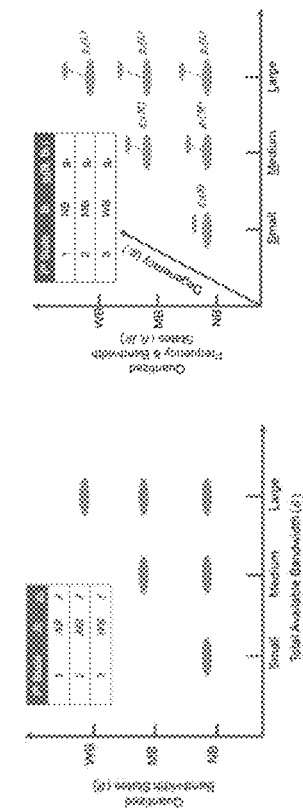
FIGS. 3A and 3B represent formulating spectrum allocation, using a framework of quantum statistical mechanics.
Figure 3A:
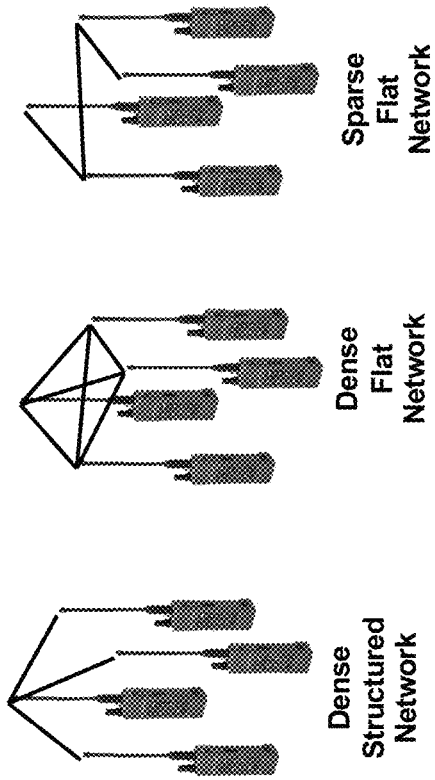
Figure 3B:
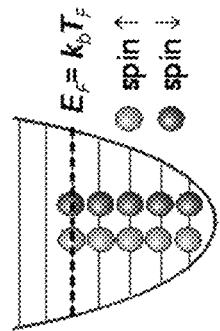
Figure 3B:
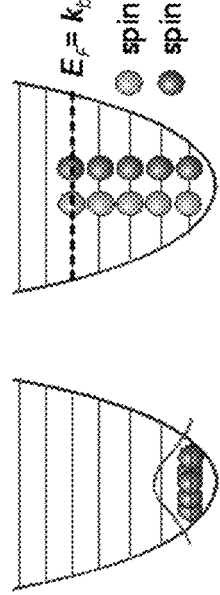
Figure 3B:
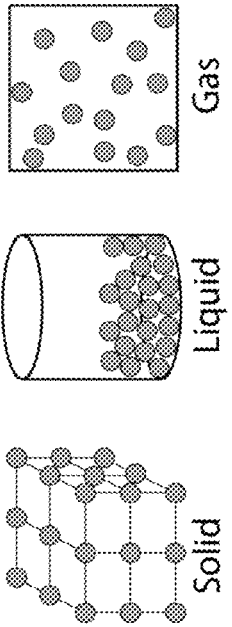

FIGS. 3A and 3B illustrates the framework of quantum statistical mechanics for formulating spectrum allocation. In this regard, FIG. 3A represents the various quantum mechanical states of matter which are used as a template for the association of spectrum in given electromagnetic atmospheric spectral states. In this regard, the quantum statistics description herein is used to address spectrum allocation in radio networks in congested (shared resources) area or contested (denied) areas. See also, FIG. 12. As shown in FIG. 3B, Bosonic and Fermionic Statistics represent a control scheme for various radio networks. The Bosonic statistics are characterized by the total available bandwidth (small, medium, large) versus the quantized bandwidth states (narrow band or NB, medium band or MB and wide band or WB). The Fermionic Statistics are characterized by the total available bandwidth (small, medium, large) versus the quantized frequency and bandwidth states. The networks can include network configurations such as dense structured network, flat structured network, and sparse flat networks.

The spectrum requirement and node range may be determined based on one or more of: a targeted spectrum utilization level for mobility traffic and fixed wireless traffic, terrain, carrier frequency, forecast of node traffic for both mobility and fixed wireless traffic, transmitted power levels of the base station, transmitted power levels of user equipment, types of user equipment, antenna tilts, antenna azimuth, antenna height, vertical beam width of the antenna, etc. The node range for a particular node may be limited by the range for a downlink transmission or the range for an uplink transmission. For example, the power levels for transmitting in the uplink and downlink directions may be different. In addition, the node range may depend on a type of connectivity at the customer premise. For example, some customers may have a premise with an outdoor antenna while other customers do not have an outdoor antenna. Furthermore, receiver sensitivity levels on base stations may be different from the levels on user devices.

In one embodiment, the present disclosure determines the node range in uplink direction, dul, in accordance with: a base station receiver sensitivity, fractional power control (FPC) parameters, and UE power limits. In order to determine the node range in the uplink direction, the method first determines a maximum path loss budget by performing link budget analysis. The method then maps the path loss budget to the frequency range of the uplink transmission in accordance with the carrier frequency and a propagation model for radio waves. The node range in the uplink direction for the particular carrier frequency and path loss budget are then determined.

In one embodiment, the method determines the node range in the uplink direction based on a type of connectivity at user location. For example, the method may provide two values for the node range in the uplink direction: one value based on an assumption of an outdoor antenna not being available at the customer premise, and a second value based on an outdoor antenna being available at the customer premise.

Figure 4:
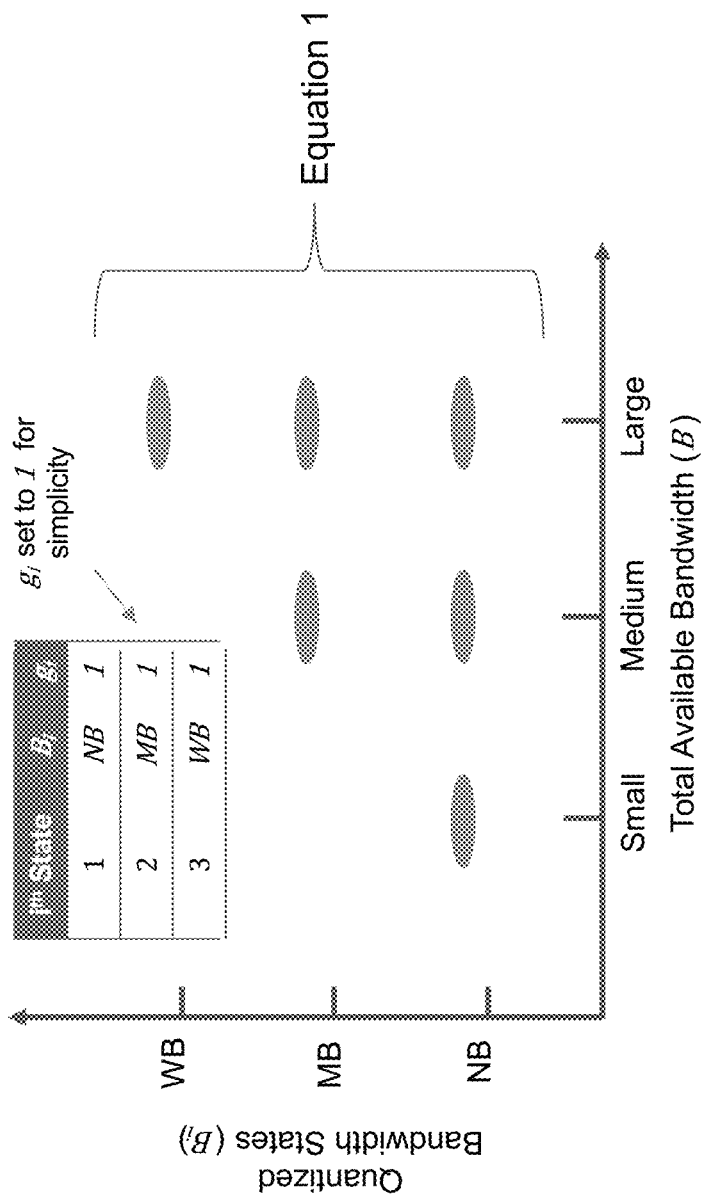
FIG. 4 represents estimating bandwidth distributions across a portion of available spectrum.

FIG. 4 illustrates a 3-state example in which bandwidth distributions are estimated across a range of available spectrum using Bosonic statistics based on the fixed total bandwidth. Bosonic statistics are used to optimally set bandwidth allocation and utilization within the available spectrum. In this regard, the states of available spectrum can be described and allocated to each node by a population distribution (e.g., code division) as follows:

$$N_i^{BE}(g_i, B_i) = \frac{g_i}{Ae^{-\beta B_i} - 1} \quad \text{Eqn 1}$$

$g_i \equiv$ State Degeneracy~Orthogonality
$A, \beta \equiv$ Coefficients determined by Constraints
The constraints for determining the coefficients are as follows:
$\Sigma N_i = N = $ Constant
$\Sigma N_i \cdot B_i \leq B = $ Constant These Bosonic statistics can be used to optimally set bandwidth allocations and utilization across a range of available spectrum.

Figure 5:
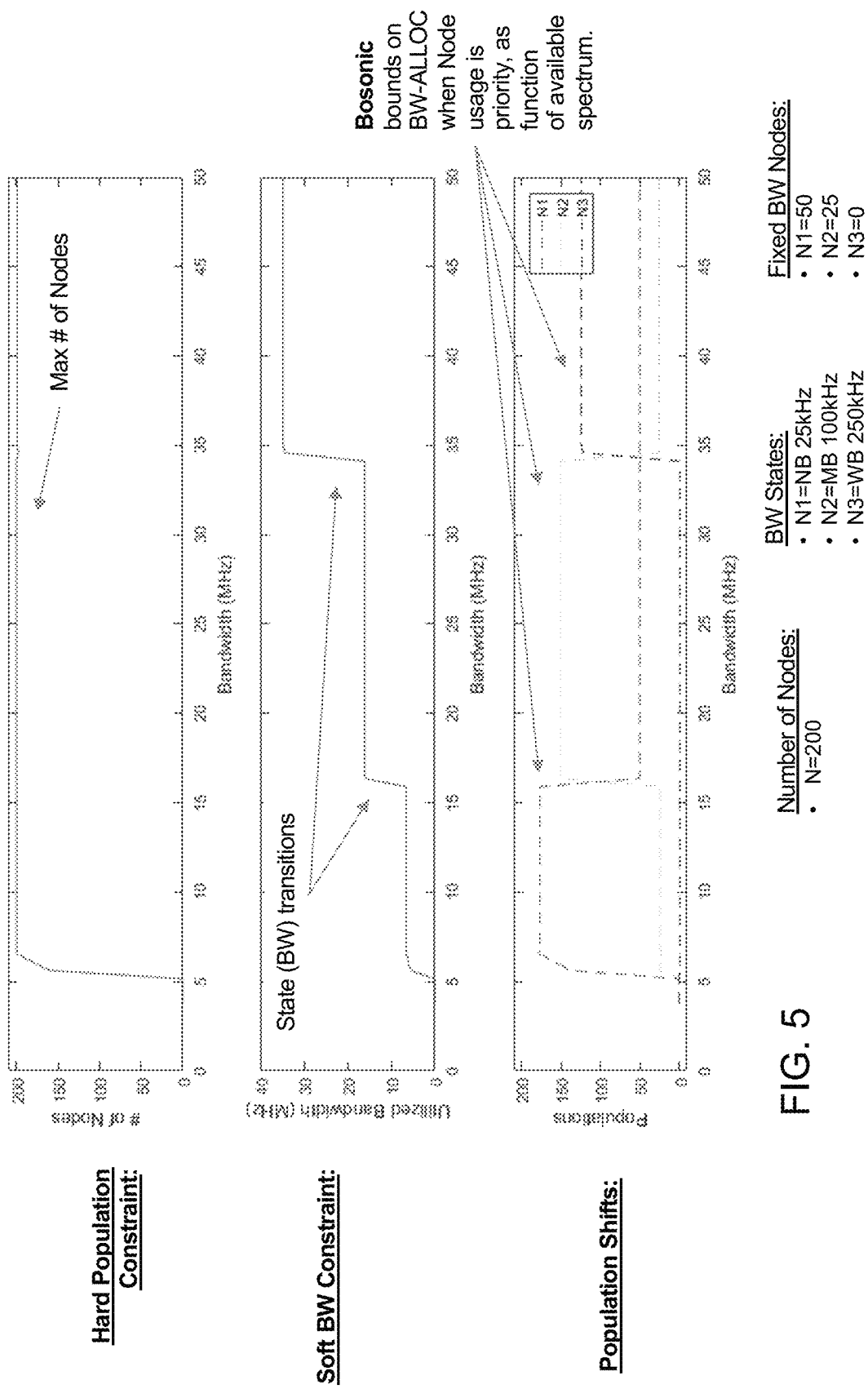
FIG. 5 represents allocating bandwidth to network nodes at the expense of total bandwidth utilization.

FIG. 5 represents an alternate method of allocating bandwidth to network nodes at the expense of total bandwidth utilization utilizing the Bosonic statistics. This control algorithm is good for a first condition where resilient networks are in a highly contested environment. This control algorithm may utilize a hard population constraint (upper graph) where some bandwidth is allocated to each of the nodes. This control scheme may also utilize a soft bandwidth constraint (middle graph) where network bandwidth utilization may be less than the total available bandwidth depending on the number and type of nodes. This control algorithm may also utilize population shifts in the spectrum (lower graph). With population shifts, network nodes are automatically transitioned from low bandwidth states to higher bandwidth states, as available bandwidth increases. Using this control algorithm configures Bosonic bounds on bandwidth allocation when node usage is priority, as a function of available spectrum. As can be seen, when state bandwidth transitions occur, bandwidth is available and transition of populations of signals to higher bandwidth states is completed.

Figure 6:
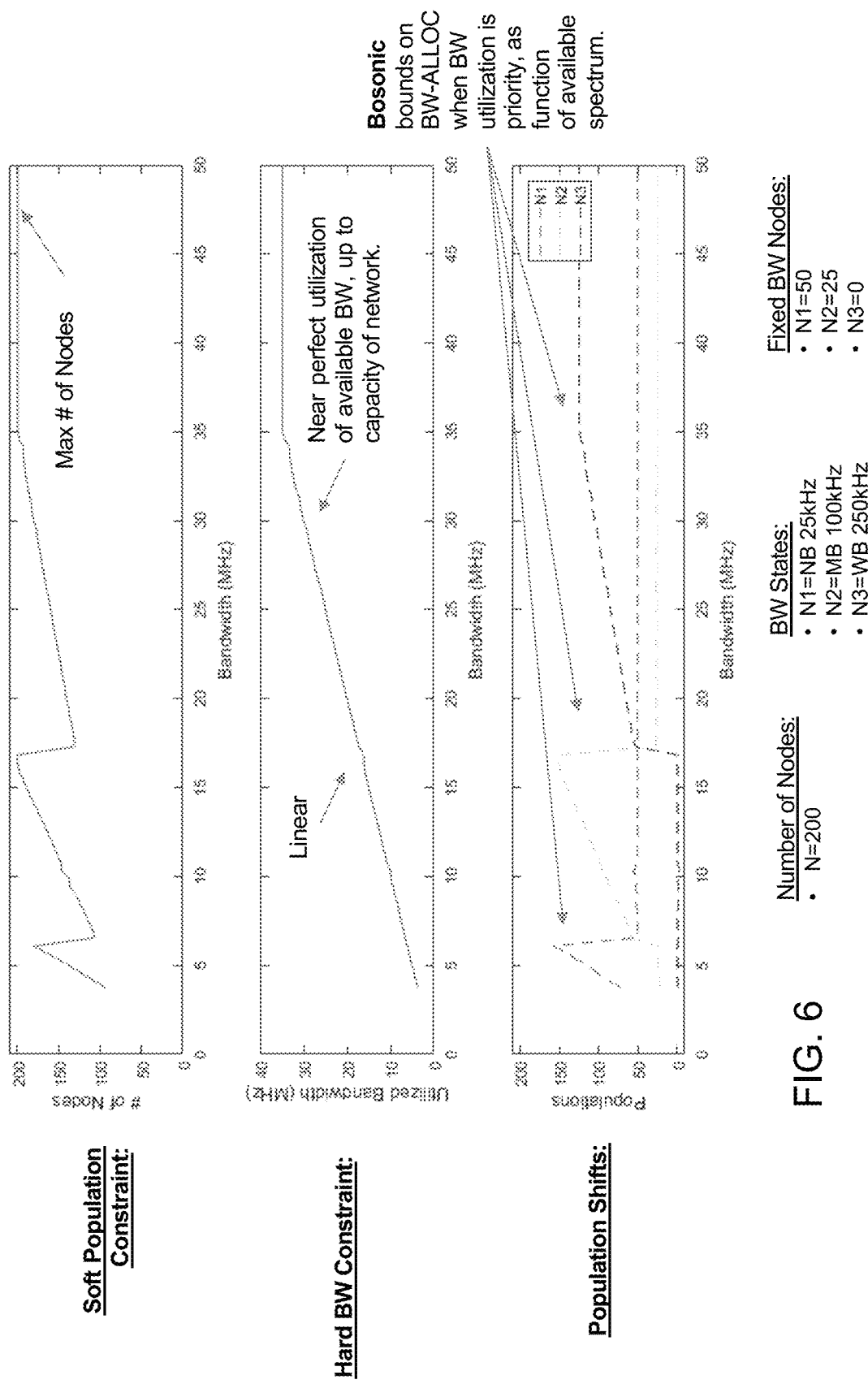
FIG. 6 represents allocating bandwidth to maximize bandwidth utilization at the expense of some network nodes.

As can be seen in FIG. 6, bandwidth can be maximized using the bosonic control algorithm by providing bandwidth to certain system nodes at the expense of other network nodes. This control algorithm is good, for a second condition having applications in rich networks that need to maximize bandwidth usage. To maximize bandwidth, a soft population constraint (upper graph) is utilized where some nodes may not be allocated any bandwidth or may be allocated reduced bandwidth. This algorithm includes a hard bandwidth constraint (middle graph) where network bandwidth utilization should be equal to, or nearly equal to the total available bandwidth at all. With respect to population shifts (lower graph) in resources, network nodes transition to higher bandwidth states as available bandwidth increases.

Figure 7:
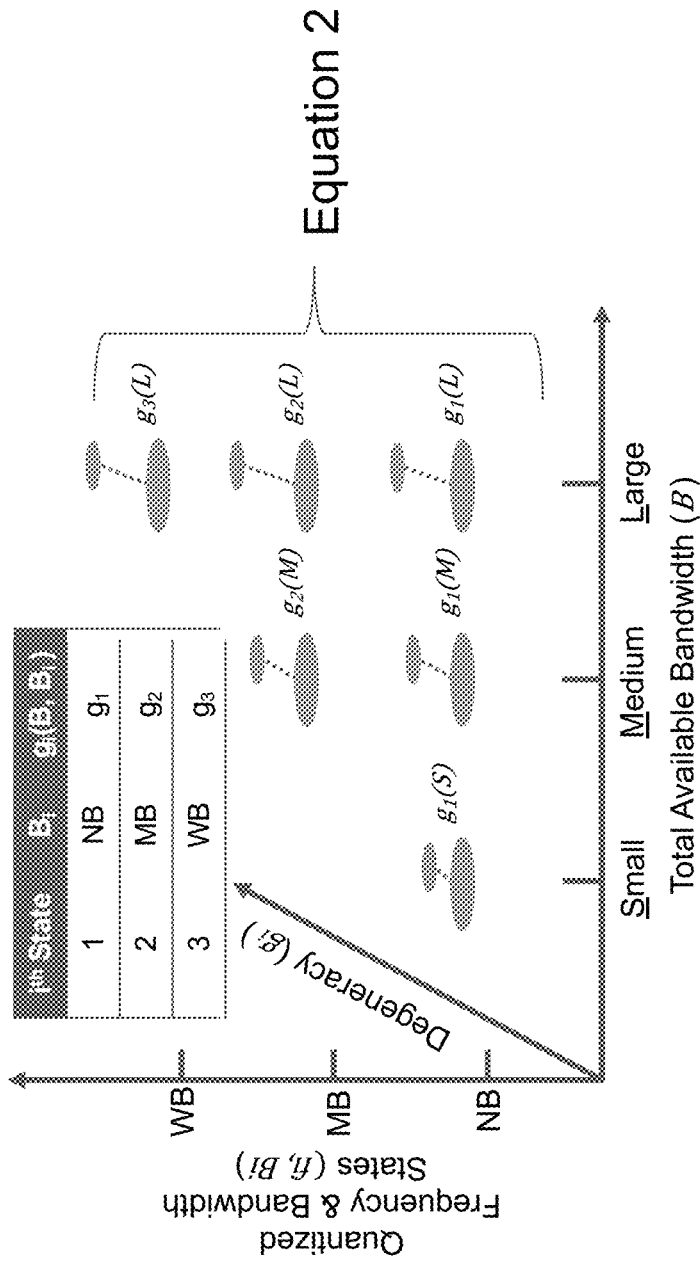
FIG. 7 represents estimating frequency/bandwidth distributions across portion of the available spectrum using Fermionic statistics.

FIG. 7 illustrates a 3-state example in which frequency and bandwidth distributions are estimated across a range of available spectrum using Fermionic statistics based on the channelized frequency and the fixed total bandwidth. Fermionic statistics are used to optimally set frequency and bandwidth allocation and utilization within the available spectrum. In this regard, the states of available spectrum can be described and allocated to each node by a population distribution as follows:
Population Distribution:

$$N_i^{FD}(g_i, B_i) = \frac{g_i}{Ae^{-\beta B_i} - 1} \quad \text{Eqn 2}$$

Figure 8:
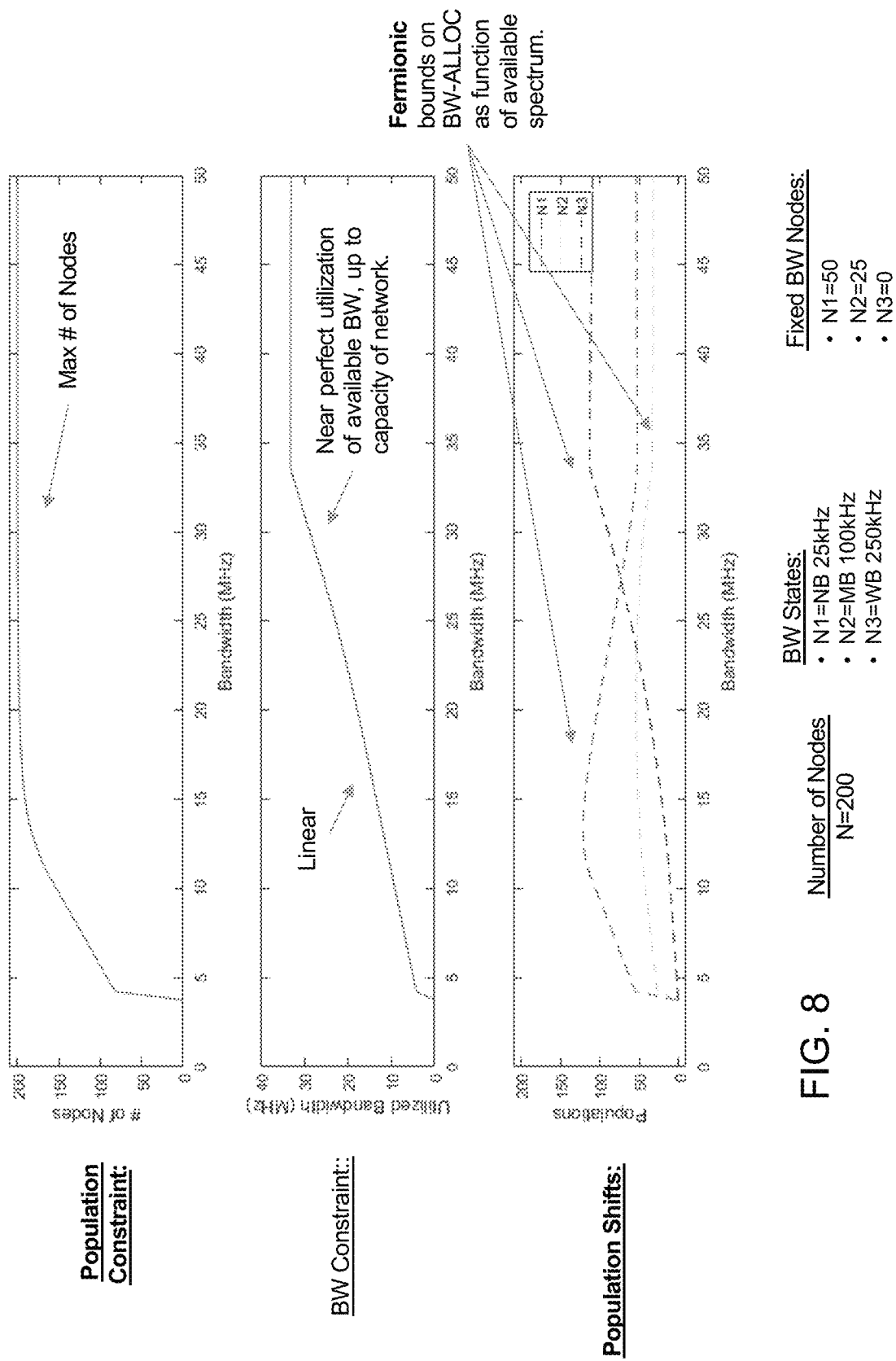
FIG. 8 represents allocating frequency and bandwidth to network nodes while maximizing use of spectrum.

$g_i \equiv$ State Degeneracy
$A, \beta \equiv$ Coefficients determined by Constraints
The constraints for determining the coefficients are as follows:
$\Sigma N_i = N = $ Constant
$\Sigma N_i \cdot B_i \leq B = $ Constant FIG. 8 represents an alternate method of allocating frequency and bandwidth to network nodes while maximizing use of spectrum utilizing Fermionic statistics. This control algorithm is generally applicable to all networks and is well-suited for congested and contested environments. This control algorithm may utilize a population constraint (upper graph) where all nodes are allocated some bandwidth. The control algorithm may also utilize a bandwidth constraint (middle graph) where network bandwidth utilization may be less than the total available bandwidth. The control algorithm may further utilize population shifts (lower graph), which occur in the system such that the network nodes transition to higher bandwidth states, as available bandwidth increases. Using this control algorithm configures Fermionic bounds on bandwidth allocation as a function of available spectrum.

Figure 9:
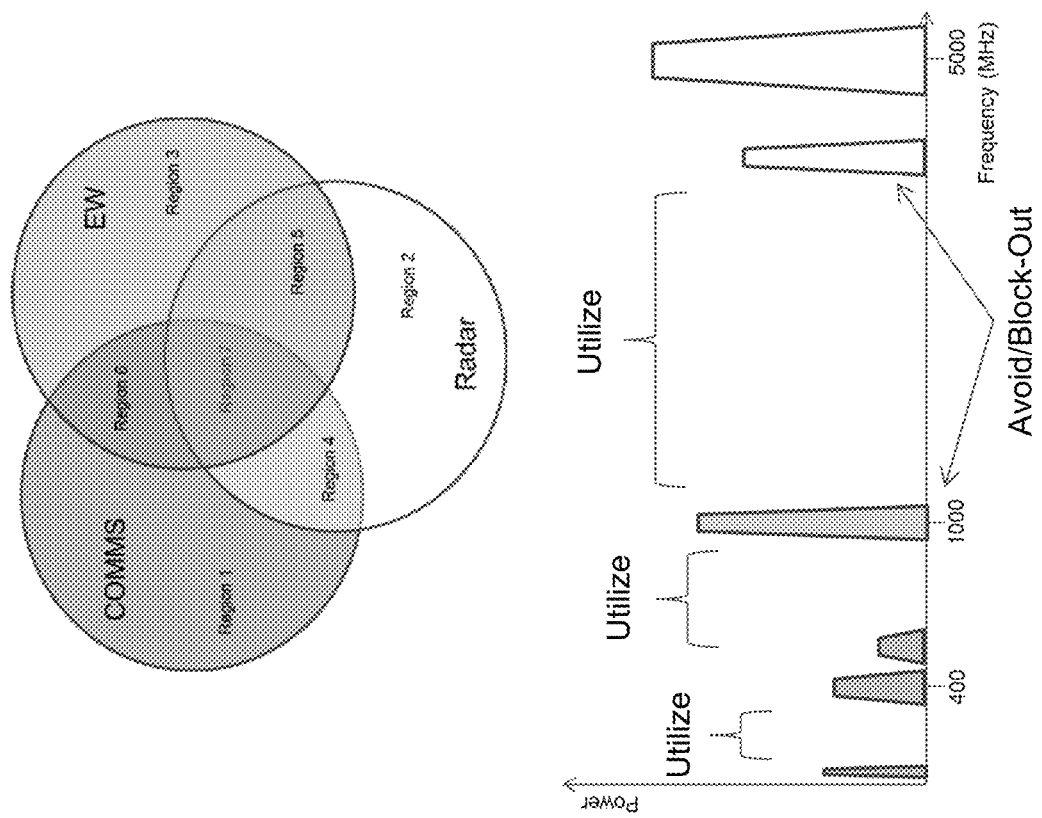
FIG. 9 represents allocating frequency and bandwidth in a non-contiguous spectrum and frequency reuse.

FIG. 9 represents the application of the above-described control algorithms in a system to utilize non-contiguous ranges of spectrum and frequency reuse. In this regard, the system implements spectrum ingest and analysis technologies to assess local spectrum usage. As seen in the Venn diagram, the available bands for different uses can have overlapping bands. Here, Radar, EW, and Comms can, interfere with each other and if such, the distribution of the spectrum between these uses must be managed. The system allows for the coordination and collaboration with multi-function subnetwork servers 108 to maximize available bandwidth. The system also implements select subnet statistics, frequency and bandwidth allocation as well as utilization which are derived from the operations commander node 102 indicative of a commander intent to enable computation of optimal frequency and bandwidth allocation for collection of subnets. Degeneracy ($g_i$) is calculated to determine the population distribution of the nodes. Degeneracy ($g_i$) in this allocation schema is modelled as a linear function of carrier to noise ratio (C/I) as follows:

$$g_i(C/I) \sim 1 + g_0 \cdot C/I$$

Figure 10:
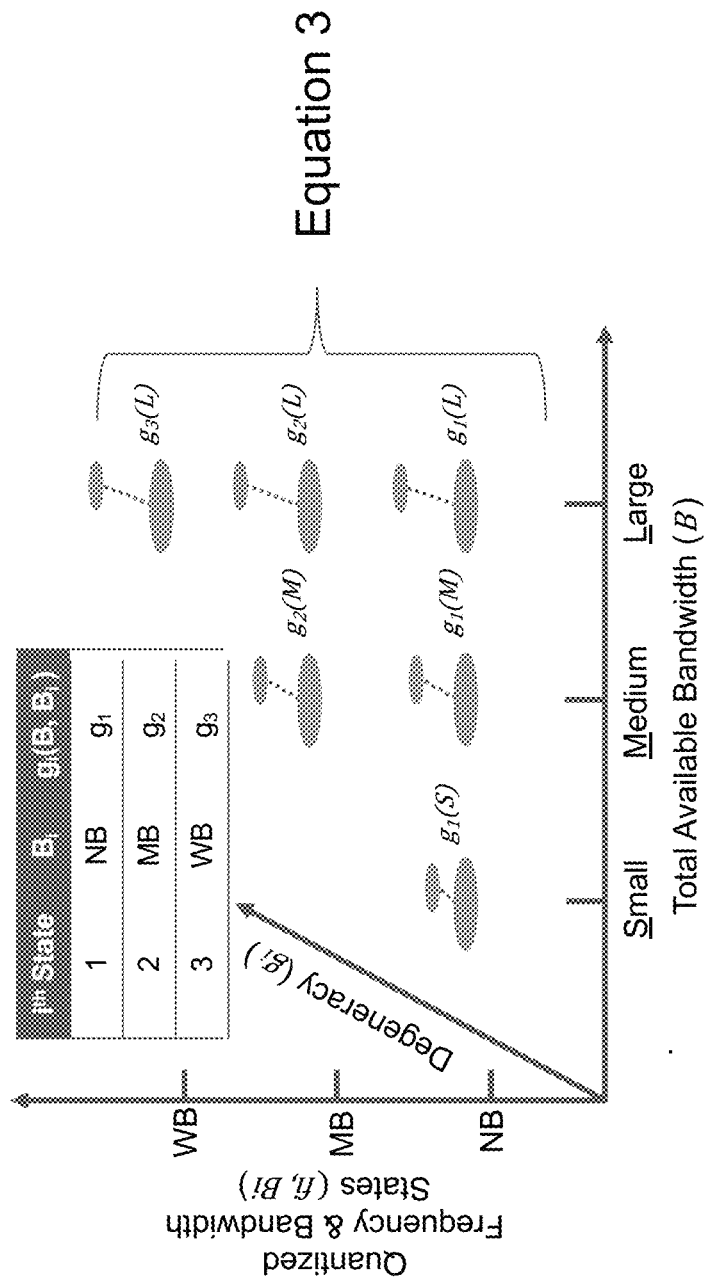
FIG. 10 represents allocating frequency and bandwidth using carrier to interference ratio (C/I) to express frequency reuse as a parameter within the degeneracy factor.
Figure 11:
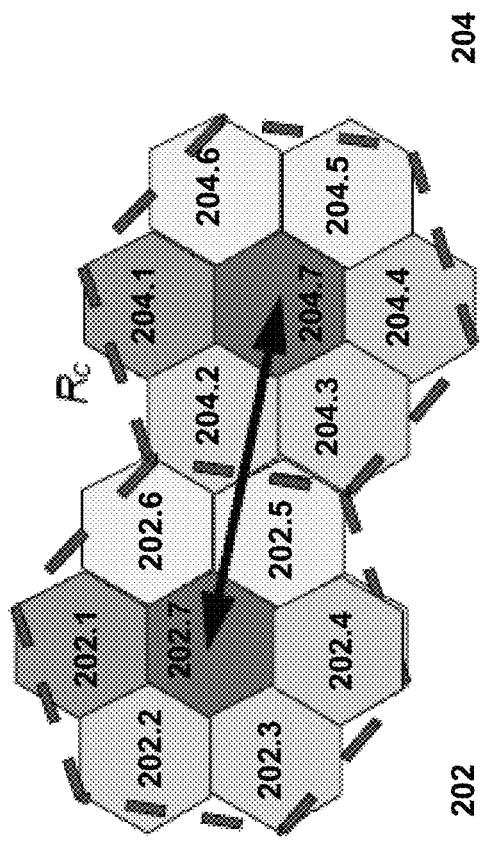
FIG. 11 represents modeling interference nodal modeling interference.
Figure 11:
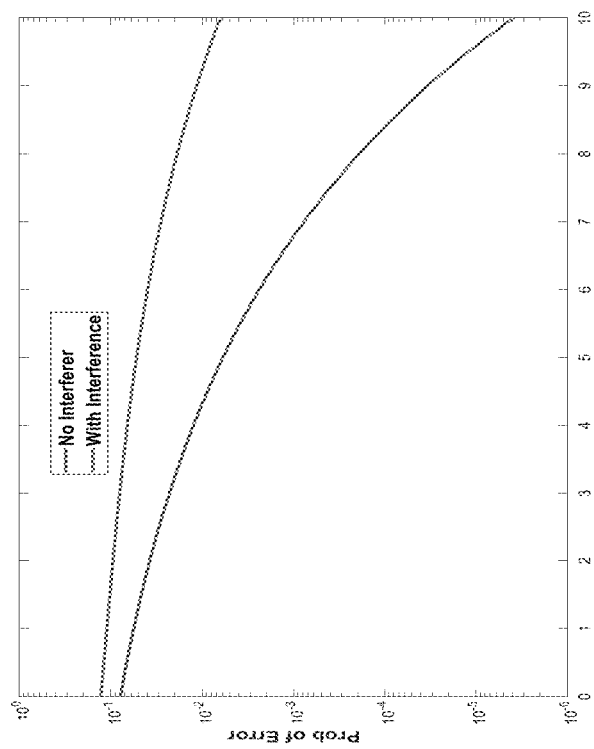

FIG. 10 illustrates a 3-state example in which carrier to interference ratio accounts for frequency reuse using Fermionic statistics based on the channelized frequency and the fixed total bandwidth. In this regard, the channelized frequency and fixed total bandwidth for a node (102, 104, 106, 108 in FIG. 1) is controlled using Fermionic Statistics. In this regard, the channelized frequency and states of available spectrum can be described and allocated to each node by a population distribution as follows:
Population Distribution:

$$N_i^{FD}(g_i, B_i) = \frac{g_i}{Ae^{-\beta B_i} - 1} \qquad \text{Eqn 3}$$

$$g_i = 1 + \alpha_i \left(\frac{C}{I}\right)$$

$$\alpha_i = (g_{i,max} - g_{i,min}) \Big/ \left(\frac{C}{I_{max}} - \frac{C}{I_{min}}\right)$$

A,β=Coefficients determined by Constraints
The constraints for determining the coefficients are as follows:
$\Sigma N_i = N =$ Constant
$\Sigma N_i \cdot B_i \leq B =$ Constant In one implementation illustrated in FIG. 11, interference is modeled using a theater of operations architecture 200 having tessellated/cellular structure with cluster 202, 204 having a plurality of cells 202$_i$, 204$_i$. Shown in the graph is the probability of error for a given signal to noise ratio (SNR). One or more nodes may be located within a cell. The probability of interference is higher within the cell, leading to less re-use of frequencies therein. However, there can be more re-use of frequencies between cells and between clusters. In situations where a jamming signal is present, frequency re-use is minimized since a jamming signal can cross cells and clusters.

Figure 12:
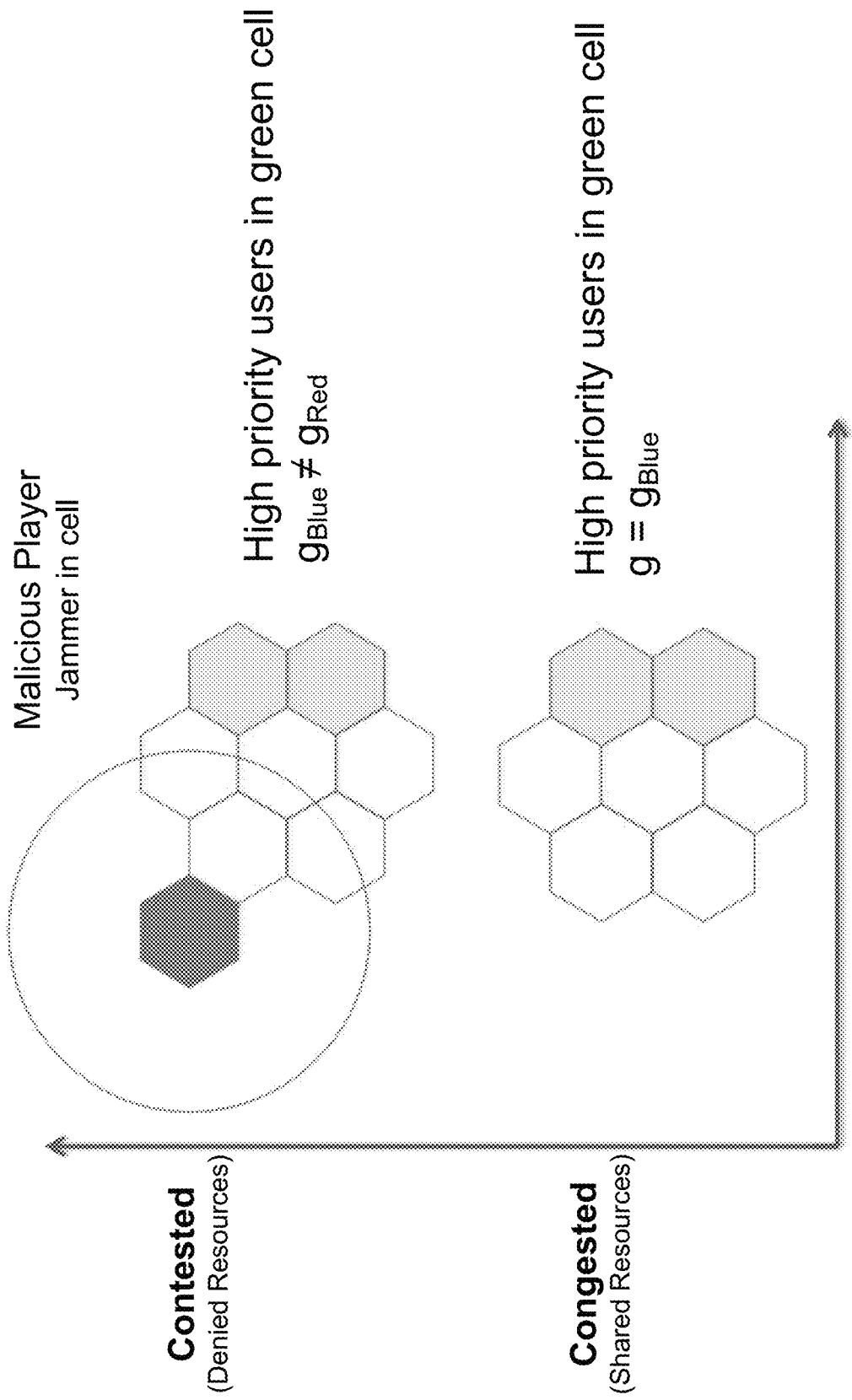
FIG. 12 represents allocating frequency and bandwidth in congested and contested scenarios.

FIG. 12 represents the modeling of scenarios having congested and contested spectral states. A coverage area (geographical or spectral range) of a cell may depend on a number of factors including frequency band, terrain, antenna height, antenna tilt, antenna azimuth, transmitted power level, etc. The geographical or spectral range of a cell may be approximated by a hexagon. The hexagons shown in FIG. 12 may be referred to as a location on a grid map indicating cell coverage.

In one embodiment, the nodes of the network 10 are located within a cell and is assigned a predetermined portion of available frequency resources such that adjacent cells may assign channels in mutually exclusive frequency ranges. In both the congested scenario (lower region) and the contested scenario (upper region), users within the lightly shaded nodes (high priority users) are allocated channelized frequency and available spectrum on a higher priority than users within the unshaded nodes (lower priority users). In a contested scenario (upper region) a malicious player (i.e., jammer) is located within a cell and nodes within that cell are denied resources effectively removing a hexagonal gird portion (darker shaded cell). This jamming will force nodes into another portion of the usable spectrum, thus reducing available bandwidth or frequency available for adjacent nodes. Alternatively, when two users are "located" in adjacent cells, bandwidth may be restricted again. It should be noted that, based on the signals received by the spectrum operator node 104, other networks may assign frequency ranges in a different manner and the present disclosure is not limited in this aspect. For example, each of the three cells above may use one third of available frequency resources. Adjacent cells may use different frequency ranges, or newly available spectral resources. The channels for adjacent cells are then assigned in mutually exclusive frequency ranges such that interference is minimized.

Figure 13:
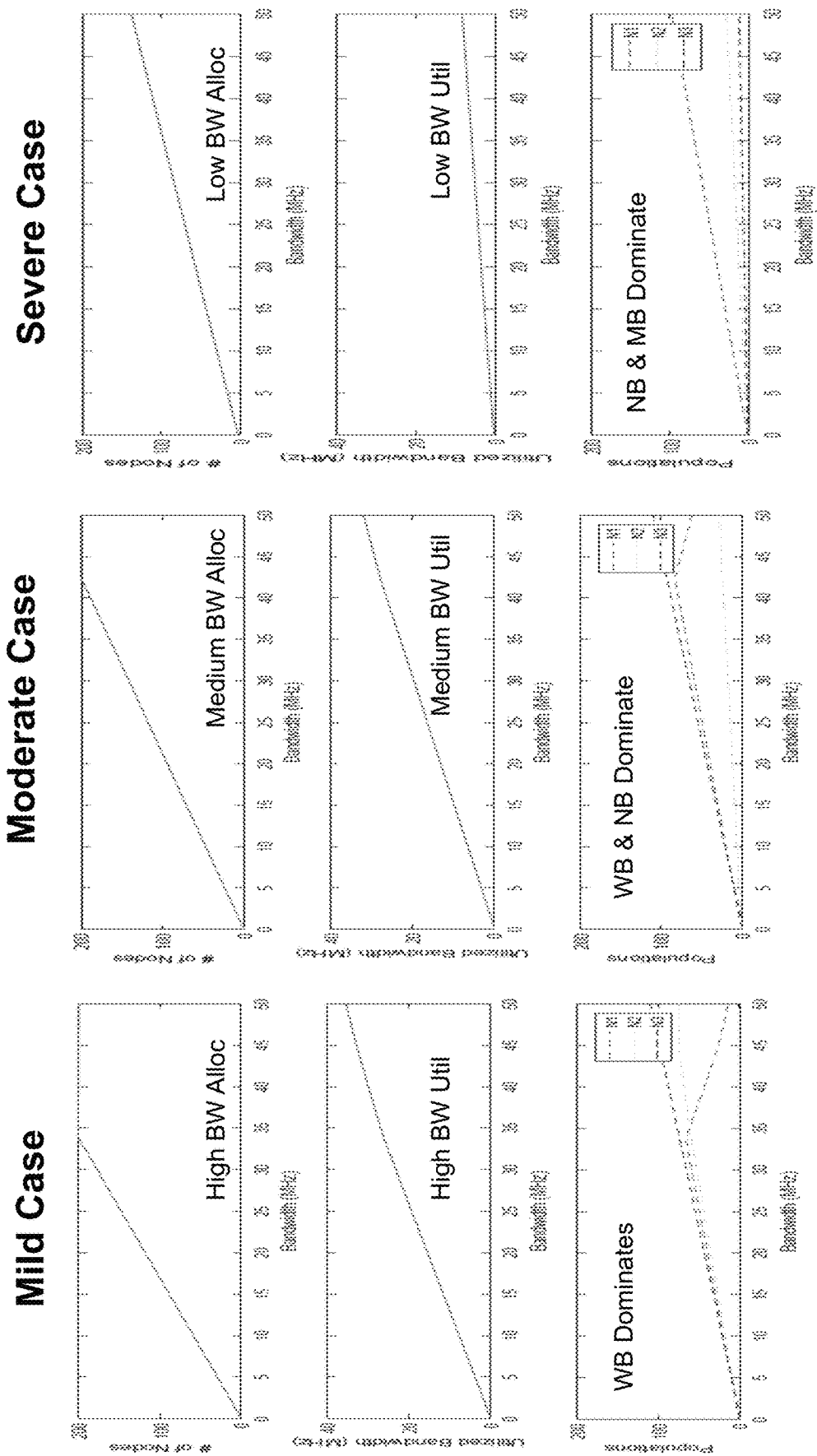
FIG. 13 represents comparison of interference scenarios.

FIG. 13 represents a comparison of interference scenarios for mild, moderate and severe cases of congestion. As can be seen, in cases of severe congestion, the number of available nodes is limited. This leads to a lower allocation of bandwidth per nodes. In the situation of Moderate congestion or interference, medium bandwidth is allocated. Similarly, in a mild or low case of interference, each node is allocated large amounts of Bandwidth. Similarly, the bandwidth utilization is minimized in situations of sever cases of congestion.

FIG. 14 illustrates an example of a system 300 using three-function, co-located, interacting heterogeneous networks in the form of a COMMS network 302, a Radar network 304 and an EW network 306. In this example, there are seven discrete regions of interaction. Regions 1, 2 and 3 represent homogeneous regions where a single (distinguishable) network is operating. Regions 4, 5 and 6 represent 2-way heterogeneous regions where two (indistinguishable) networks are operating. Region 7 represents a 3-way heterogeneous region where three (indistinguishable) networks are operating. In this example, a micro-canonical formulation is suitable for allocating channelized frequencies and available spectrum between each distinguishable network within the homogeneous regions since the networks are distinguishable. However, the heterogeneous regions require a canonical formulation to differentiate between two indistinguishable networks in the 2-way heterogeneous regions and three indistinguishable networks in the 3-way heterogeneous regions.

Implementation of the above-described system using the canonical formulation to differentiate between indistinguishable networks in a heterogeneous region based on operations commander intent is best explained using the following examples. In a first example, the commander intent seeks to allocate bandwidth equally among nodes operating in non-interfering/orthogonal modes. The system will utilize a solution implementing Bosonic statistics with hard bandwidth allocation/soft bandwidth utilization constraints as described above with reference to FIGS. 4-6. In a second example, the commander intent seeks to maximize bandwidth utilization among nodes operating in non-interfering/orthogonal modes. The system will utilize a solution implementing Bosonic statistics with soft bandwidth allocation/hard bandwidth utilization constraints as described above with reference to FIGS. 4-6.

In a third example, the commander intent seeks to maximize bandwidth allocation and utilization among nodes operating in modes that may interfere. The system will utilize a solution implementing Fermionic statistics with hard bandwidth allocation/utilization constraints as described above with reference to FIGS. 7-8. In a fourth example, the Commander wants to treat distinguishable networks differently. The system will utilize a solution combining Bosonic statistics, Fermionic statistics and Boltzmann function depending on intent details as further explained below.

With reference now to FIGS. 14 and 15, the system interprets a commander intent to distribute bandwidth and spectrum, which includes mapping of the commander intent related to multi-function missions and statistics for frequency/bandwidth allocation and utilization. The control algorithm will determine the optimal use of the communication nodes ($C_1$-$C_4$), the radar nodes ($R_1$-$R_3$) and the EW nodes ($EW_2$-$EW_5$). If, however, the available resources are insufficient, optimal configuration may still not fully satisfy the commander intent. In this circumstance, a best fit for the available resources will be assigned to the nodes.

By way of example represented in the table of FIG. 15, a first commander intent ($I_1$) may provide high priority video within subnet over Radar & EW by controlling the system for: (a) high frequency/bandwidth allocation and high utilization for communication node $C_1$ and EW node $EW_4$ using a Bosonic statistical model; and (b) medium frequency/bandwidth allocation and medium utilization for radar node $R_2$ using a Fermionic statistical model.

A second commander intent ($I_2$) prioritizes command and control across all nodes over Radar & EW missions by controlling the system for: (a) high frequency/bandwidth allocation and medium utilization for communication node C1 using a Bosonic statistical model; (b) high frequency/bandwidth allocation and low utilization for communication nodes $C_2$-$C_4$ using a Bosonic statistical model; (c) high frequency/bandwidth allocation and low utilization for radar nodes $R_1$-$R_3$ using a Fermionic statistical model; (d) high frequency/bandwidth allocation and medium utilization for EW node $EW_2$ using a Bosonic statistical model; and (e) medium frequency/bandwidth allocation and medium utilization for EW node $EW_3$ using a Fermionic statistical model.

A third commander intent ($I_3$) prioritizes radar track while search over COMMS & EW missions by controlling the system for: (a) high frequency/bandwidth allocation and high utilization for radar nodes $R_1$-$R_2$ using a Fermionic statistical model; (b) medium frequency/bandwidth allocation and medium utilization for communication node $C_3$ and for EW nodes $EW_3$-$EW_4$ using a Fermionic statistical model; and (c) low frequency/bandwidth allocation and low utilization for EW node $EW_5$ using a Bosonic statistical model. As noted above, the system will determine, for each of these examples, the optimal use of resources given commander intent and apply either a Fermionic- or Bosonic-type solution to the allocation of spectrum resources.

FIGS. 16A and 16B represent the systems modeling directionality and polarization, which can be used to modify the frequency and bandwidth distributions on contested scenarios. The directionality and polarization can be expressed in terms of extended degeneracy ($g_i$) to account for directionality of antennas and polarization, which in this allocation schema is modelled as:

$$g_i = \left[1 + \alpha_i \left(\frac{C}{I}\right)\right][\zeta][\gamma]$$

$\zeta$ is the Directional Antenna Factor
$\gamma$ is the Polarization Factor

FIG. 17 illustrates the relationship between bandwidth and a value function (VF) for a non-polarized scenario and a polarized scenario. As can be seen, directionality can improve value function for a particular system. For directional antennas, power factors can be adjusted for various nodes. Power factors for specific nodes may be set to 1 indicating no additional power or ½ indicating double the power. For a given number of nodes, utilized bandwidth and system topography of implementation is shown.

$$VF = k_1 \frac{\text{\# of Nodes}}{\text{Max Nodes}} + k_2 \frac{\text{Utilized } BW}{BW} + k_3 \cdot PowerFactor + \frac{k_4}{\text{Complexity}}$$

$$k_1 + k_2 + k_3 + k_4 = 1$$

The foregoing principles can be extended to provide a system model which accounts for multiple networks including homogenous networks such as first and second networks applying a Fermionic-type solution (FD-FD) or applying a Bosonic-type solution (BE-BE) and/or Heterogeneous networks such as a first network applying a Fermionic-type solution and a second network applying a Bosonic-type solution (FD-BE). The inputs will include the coefficients A1, A2 and β and the degeneracies g1, g2, and the outputs will include N1 ($N1_1$, $N1_2$, $N1_3$) and B1 for statistics 1), and N2 ($N2_1$, $N2_2$, $N2_3$) and B2 for statistics 2.

As illustrated in FIG. 18A, the same results are provided using a single network model (N=200) or a multiple network model (N1=200, N2=0). FIG. 18B illustrates the effects of population distributions over multiple homogenous network (FD-FD). Sin particular, the total number of nodes is set at 200, while the population distribution is varied between the networks as follows: (N1=200, N2=0), (N1=150, N2=50), (N1=133, N2=67) and (N1=100, N2=100). As seen in the top plots, the total population increases with even distribution across the networks. Band width utilization also increases but more gradually than total population.

Systems implementing the above-described control algorithms have been validated for various mixed model applications including: (i) multiple statistics applications such as BE-BE, FD-BE; (ii) structured networks such as separate C2 and data plans; or other multiple network configurations allowing for degeneracy factor to model spread spectrum CDMA (i.e., frequency reuse or control of heterogeneous networks based on directional antenna and, CDMA networks. Other implementations include networks subject to Commander's Intent, and afore mentioned development of spectrum allocation Decision algorithm.

With reference now to FIG. 19A, an implantation of a structured C2 configuration is illustrated. In this configuration, command and control (C2) is provided on FD1, with bandwidths of 25 kHz, 50 kHz, and 75 kHz, and N1=20. Data is provided on FD2 with Bandwidths of 25 kHz, 100 kHz, 250 kHz and N2=180. The No special priority is assigned to Command and Control in the initial model, and the narrow band channels are generally more available and reliable (inherent priority). As shown in the graphs, C2 on FD1 achieved maximum population at N1=20 and has inherent priority over data on FD2.

With reference now to FIG. 19B-19D, an implementation of multiple networks including CDMA on FD1 and a 4-sector directional antenna on FD2 is illustrated. In this configuration the degeneracy for FD1 is extended to account for CDMA processing gains with bandwidths of 25 kHz, 50 kHz and 75 kHz, and the bandwidths for FD2 are 25 kHz, 100 kHz and 250 kHz. In a first case shown in FIG. 19B, an even distribution of nodes is initially set so that N1=N2=100. In a second case shown in FIG. 19c, a nodal distribution is initially set to favor FD2 with N1=20 and N2=150. In a third case shown in FIG. 19D, a nodal distribution is initially set to favor FD1 with N1=150 and N2=50. In each of these cases, FD1 achieves the maximum population earlier that FD2 and uses relatively more of the available bandwidth. As such, these results show that CDMA communication system is more robust.

The system, as described herein, successfully applied quantum statistical/information theoretical methods to model networks as a system of interacting particles, where each node is capable of being in one of several discrete (quantum) states at any one time. This approach may be configured for single and/or multiple networks to optimist the number of nodes assigned as well as the bandwidth utilized within a given network. Implementation of this model-based control algorithm provides optimum spectrum usage in real-time amongst nodes in these multi-function networks while taking into account interference, directionality and polarization effects. The methods described above can be performed in a computer having a non-transitory computer-readable medium storing instruction. When executed by a processor, the instructions cause the processor to perform operations for selecting and assigning a bandwidth option for a node in a network. These operations can include obtaining, for all the discrete nodes in a communication system, network traffic data associated with a plurality of mobile and a plurality of fixed location RF traffic nodes for a geographical area. A processor determines if the discrete system nodes behave indistinguishably and distinguishably, within the common geographic locational area. If the network nodes are indistinguishable, the processor assigns bandwidth to the plurality of mobile and fixed location RF traffic nodes a statistical behavior selected from one of Fermionic and Bosonic. The Fermionic nodes may only occupy a single or the same state, with or without degeneracy. In the nodes that are distinguishable, then their statistical behavior is Boltzmann, and they may occupy the same state provided there is degeneracy to the overall bandwidth for information to be transferred.

It should be noted that the teachings of the present disclosure can be implemented in software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. For example, a computer-readable medium may be in communication with the processor, where the computer-readable medium having stored thereon a plurality of instructions, the plurality of instructions including instructions which, when executed by the hardware processor, cause the hardware processor to perform the methods as disclosed above.

In one embodiment, the present module or processor for allocating and optimizing a radio frequency spectrum in a fixed wireless network can be loaded into memory and executed by processor to implement the functions as discussed above. As such, the present method for allocating and optimizing a radio frequency spectrum in a fixed wireless network (including associated data structures) of the present disclosure can be stored on a non-transitory (e.g., tangible or physical) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments but should be defined only in accordance with the following claims and their equivalents.

What is claimed is:

1. A method for assigning bandwidth and frequencies radio nodes in a communications network, comprising:
   obtaining, by a processor, spectrum availability data associated with a first plurality of mobile radio nodes and a first plurality of fixed location radio nodes for a geographical area;
   determining, by the processor a list of missions, statistics, present frequency/bandwidth allocation and utilization associated with the mobile and fixed location radio nodes; and
   determining, and allocating bandwidth and frequencies to a second plurality of mobile and fixed location radio nodes based on one of the following conditions:
   a first Bosonic condition, wherein a plurality of nodes are allocated equal bandwidth and each node is configured to transition to a higher bandwidth state when available bandwidth increases;
   a second Bosonic condition, wherein a soft population constraint is utilized to maximize bandwidth such that initially the nodes are assigned a null bandwidth state and transition to a higher bandwidth state as when available bandwidth increases; and
   a third Fermionic condition, wherein a frequency and bandwidth is allocated to nodes while maximizing use of available bandwidth.

2. The method of claim 1, further comprising:
   transmitting the allocated bandwidth and frequencies to the second plurality of mobile and fixed location radio nodes.

3. The method of claim 1, wherein the first Bosonic condition selects a smallest bandwidth option from a plurality of bandwidth options.

4. The method of claim 1, wherein the second Bosonic condition selects a maximum bandwidth option from a plurality of bandwidth options.

5. The method of claim 1, further comprising:
   determining a spectral capacity surplus condition; and
   increasing the bandwidth of a node when there is spectral capacity surplus condition.

6. The method of claim 1, wherein determining, and allocating bandwidth and frequencies comprises mapping a commander intent.

7. The method of claim 6, wherein the commander intent includes electronic warfare.

8. The method of claim 1, wherein the processor is configured to provide spectrum allocation in multifunction, co-located, interacting heterogeneous networks.

9. The method of claim 1, further comprising determining a first mobile radio node range in a downlink direction.

10. The method of claim 9, wherein the first mobile radio node range in the downlink direction is performed in accordance with a physical characteristic of an antenna.

11. The method of claim 10, further comprising determining a second mobile radio node range in an uplink direction in accordance with the physical characteristic of the antenna, wherein the physical characteristics of the antenna comprises a receiver sensitivity.

12. The method of claim 11, wherein the determining of the second mobile radio node range in the uplink direction is performed in accordance with the physical characteristic of the antenna.

13. The method of claim 1, wherein the spectrum availability data is bounded by an aggregate spectrum bandwidth.

14. The method of claim 13, wherein the spectrum availability data is performed in accordance with the aggregate spectrum bandwidth.

15. A non-transitory computer-readable medium storing instructions which, when executed by a processor, cause the processor to perform operations for selecting and assigning a bandwidth option for discrete nodes in a network of a communication system, the operations comprising:
  obtaining network traffic data associated with a plurality of mobile and a plurality of fixed location RF traffic nodes for a common geographical locational area; and
  determining when the discrete nodes behave indistinguishably within the common geographic locational area, wherein the plurality of mobile and fixed RF nodes behave indistinguishably when their statistical behavior cannot be determined using at least one of a Boltzmann equation and a transfer function;
  assigning a statistical behavior to the plurality of mobile and fixed location RF traffic nodes, wherein the statistical behavior is selected from one of Fermionic and Bosonic; and
  allocating bandwidth to the plurality of mobile and fixed location RF traffic nodes based on the statistical behavior.

16. The non-transitory computer-readable medium of claim 15, the statistical behavior to the plurality of mobile and fixed location RF traffic nodes is Fermionic and Boltzmann.

17. The non-transitory computer-readable medium of claim 15, wherein assigning bandwidth comprises selecting a bandwidth option from a plurality of bandwidth options at one of a commander node, a spectrum operator node, and a plurality of servers, or combinations thereof.

18. The non-transitory computer-readable medium of claim 15, wherein assigning bandwidth comprises one of selecting a maximum bandwidth option, assigning bandwidth equally among the nodes of the network and assigning a frequency to the nodes in the network.

19. An apparatus for selecting and assigning available spectrum to a plurality of nodes within a communication network, comprising:
  a processor; and
  a computer-readable medium storing a plurality of instructions which, when executed by the processor, cause the processor to perform operations, the operations including,
  obtaining, for each of the plurality of nodes within the network, network traffic data associated with each of a plurality of mobile and fixed RF nodes in a common geographical locational area;
  determining when the plurality of mobile and fixed RF nodes behave indistinguishably, within the common geographic locational area, by determining if the statistical behavior of the discrete nodes cannot be determined using one of a Boltzmann equation or a transfer function;
  assigning a statistical behavior when the plurality of mobile and fixed location RF traffic nodes behave indistinguishably, wherein the statistical behavior is selected from one of Fermionic and Bosonic;
  allocating a bandwidth option from a plurality of bandwidth option based on the statistical behavior.

20. The apparatus for selecting and assigning available spectrum to a plurality of nodes within a communication network according to claim 19 wherein the plurality of instructions allocating the bandwidth based on a commander intent accessed by the processor from a memory store.

* * * * *